(12) United States Patent
Lumsden et al.

(10) Patent No.: US 8,823,314 B2
(45) Date of Patent: Sep. 2, 2014

(54) ENERGY SAVING SYSTEM AND METHOD FOR DEVICES WITH ROTATING OR RECIPROCATING MASSES

(75) Inventors: John L. Lumsden, Boca Raton, FL (US); Paul H. Kelley, Boca Raton, FL (US); Vasan Venkataraman, Fort Lauderdale, FL (US)

(73) Assignee: The Powerwise Group, Inc., Boca Raton, FL (US)

( * ) Notice: Subject to any disclaimer, the term of this patent is extended or adjusted under 35 U.S.C. 154(b) by 598 days.

(21) Appl. No.: 12/873,510

(22) Filed: Sep. 1, 2010

(65) Prior Publication Data

US 2010/0320956 A1 Dec. 23, 2010

Related U.S. Application Data

(63) Continuation-in-part of application No. 12/207,913, filed on Sep. 10, 2008.

(60) Provisional application No. 61/240,399, filed on Sep. 8, 2009, provisional application No. 61/135,402, filed on Jul. 21, 2008, provisional application No. 60/993,706, filed on Sep. 14, 2007.

(51) Int. Cl.
*H02P 3/18* (2006.01)
*H02P 23/00* (2006.01)
*H02P 25/00* (2006.01)

(52) U.S. Cl.
USPC ....... 318/812; 318/799; 318/621; 318/400.14

(58) Field of Classification Search
CPC ........................................................ H02P 6/182
USPC .............................. 318/812, 799, 621, 400.14
See application file for complete search history.

(56) References Cited

U.S. PATENT DOCUMENTS 2,276,358 A 3/1942 Vickers
2,345,933 A 4/1944 Ibbotson et al.

(Continued)

FOREIGN PATENT DOCUMENTS

CN 101207352 A 6/2008
EP 0330477 A2 8/1989

(Continued)

OTHER PUBLICATIONS

International Search Report for International Application No. PCT/US2010/047477, dated Oct. 15, 2010 (this corresponds with U.S. Appl. No. 12/873,510) (3 pages).

(Continued)

*Primary Examiner* — Erick Glass
(74) *Attorney, Agent, or Firm* — Novak Druce Connolly Bove + Quigg LLP

(57) ABSTRACT

A system and method are provided for reducing the energy consumed by a pump jack electric motor by reducing the supply voltage to the motor when the motor would be generating energy in open loop mode. By substantially eliminating the energy generation mode, the braking action of the utility grid in limiting the acceleration of the motor and system that would otherwise occur is substantially removed. The motor and system will speed up, allowing the natural kinetic energy of the cyclic motion to perform part of the pumping action. A closed loop controller in electrical connection with the motor computes the necessary information from the observed phase angle between the voltage and current supplied to the motor. By reducing the supply voltage to the motor, the observed phase angle may be reduced to a target phase angle value. By allowing some current flow, primarily of a reactive nature, an observable feedback parameter may be used in the closed loop control system as an indication of the load condition, to which the closed loop motor controller may react, supplying power when needed, such as in the energy consumption mode. The electric motor may be effectively turned off, but without completely cutting the power to the motor. During both the energy consumption mode and the period that open loop energy generation would be occurring, the closed loop motor controller may reduce the observed phase angle to a target phase angle by reducing the supply voltage. Any further reduction in the observed phase angle below the target phase angle may be interpreted as an increase in motor load, to which the motor controller may respond by increasing the supply voltage to the motor until the target phase angle is once again reached.

23 Claims, 20 Drawing Sheets

(56) References Cited

U.S. PATENT DOCUMENTS

| | | |
|---|---|---|
| 3,440,512 A | 4/1969 | Hubby |
| 3,470,443 A | 9/1969 | Nola et al. |
| 3,470,446 A | 9/1969 | Nola et al. |
| 3,523,228 A | 8/1970 | Nola et al. |
| 3,541,361 A | 11/1970 | Nola |
| 3,578,886 A | 5/1971 | Nino |
| 3,582,774 A | 6/1971 | Forgacs |
| 3,671,849 A | 6/1972 | Kingston |
| 3,718,846 A | 2/1973 | Bejach |
| 3,740,629 A | 6/1973 | Kohlhagen |
| 3,753,472 A | 8/1973 | Dwbwad et al. |
| 3,851,995 A | 12/1974 | Mills |
| 3,860,858 A | 1/1975 | Nola |
| 3,953,777 A | 4/1976 | McKee |
| 3,959,719 A | 5/1976 | Espelage |
| 3,976,987 A | 8/1976 | Anger |
| 4,039,946 A | 8/1977 | Nola |
| 4,051,736 A | 10/1977 | Jones |
| 4,052,648 A | 10/1977 | Nola |
| 4,096,436 A | 6/1978 | Cook et al. |
| 4,145,161 A | 3/1979 | Skinner |
| 4,168,491 A | 9/1979 | Phillips et al. |
| 4,173,451 A | 11/1979 | Moore, Jr. |
| 4,220,440 A | 9/1980 | Taylor et al. |
| 4,266,177 A | 5/1981 | Nola |
| 4,324,987 A | 4/1982 | Sullivan, II et al. |
| 4,333,046 A | 6/1982 | Lee |
| 4,346,339 A | 8/1982 | Lewandowski |
| 4,353,025 A | 10/1982 | Dobkin |
| 4,363,605 A | 12/1982 | Mills |
| 4,388,585 A | 6/1983 | Nola |
| 4,391,155 A | 7/1983 | Bender |
| 4,392,100 A | 7/1983 | Stanton et al. |
| 4,400,657 A | 8/1983 | Nola |
| 4,404,511 A | 9/1983 | Nola |
| 4,412,167 A | 10/1983 | Green et al. |
| 4,413,676 A | 11/1983 | Kervin |
| 4,417,190 A | 11/1983 | Nola |
| 4,420,787 A | 12/1983 | Tibbits et al. |
| 4,426,614 A | 1/1984 | Nola |
| 4,429,269 A | 1/1984 | Brown |
| 4,429,578 A | 2/1984 | Darrel et al. |
| 4,433,276 A | 2/1984 | Nola |
| 4,439,718 A | 3/1984 | Nola |
| 4,454,462 A | 6/1984 | Spann |
| 4,456,871 A | 6/1984 | Stich |
| 4,459,528 A | 7/1984 | Nola |
| 4,469,998 A | 9/1984 | Nola |
| 4,489,243 A | 12/1984 | Nola |
| 4,490,094 A | 12/1984 | Gibbs |
| 4,513,240 A | 4/1985 | Putman |
| 4,513,274 A | 4/1985 | Halder |
| 4,513,361 A | 4/1985 | Rensink |
| 4,551,812 A | 11/1985 | Gurr et al. |
| 4,561,299 A * | 12/1985 | Orlando et al. ............ 73/152.61 |
| 4,616,174 A | 10/1986 | Jorgensen |
| 4,631,954 A | 12/1986 | Mills |
| 4,644,234 A | 2/1987 | Nola |
| 4,649,287 A | 3/1987 | Nola |
| 4,659,981 A | 4/1987 | Lumsden |
| 4,679,133 A | 7/1987 | Moscovici |
| 4,689,548 A | 8/1987 | Mechlenburg |
| 4,706,017 A | 11/1987 | Wilson |
| 4,716,357 A | 12/1987 | Cooper |
| 4,819,180 A | 4/1989 | Hedman et al. |
| 4,841,404 A | 6/1989 | Marshall et al. |
| 4,859,926 A | 8/1989 | Wolze |
| 4,876,468 A | 10/1989 | Libert |
| 4,971,522 A | 11/1990 | Butlin |
| 4,997,346 A | 3/1991 | Bohon |
| 5,003,192 A | 3/1991 | Beigel |
| 5,010,287 A | 4/1991 | Mukai et al. |
| 5,044,888 A | 9/1991 | Hester, II |
| 5,066,896 A | 11/1991 | Bertenshaw et al. |
| 5,134,356 A | 7/1992 | El-Sharkawi et al. |
| 5,136,216 A | 8/1992 | Wills et al. |
| 5,180,970 A | 1/1993 | Ross |
| 5,202,621 A | 4/1993 | Reischer |
| 5,204,595 A | 4/1993 | Opal et al. |
| 5,214,621 A | 5/1993 | Maggelet et al. |
| 5,222,867 A | 6/1993 | Walker, Sr. et al. |
| 5,227,735 A | 7/1993 | Lumsden |
| 5,239,255 A | 8/1993 | Schanin et al. |
| 5,259,034 A | 11/1993 | Lumsden |
| 5,281,100 A | 1/1994 | Diederich |
| 5,299,266 A | 3/1994 | Lumsden |
| 5,332,965 A | 7/1994 | Wolf et al. |
| 350,988 A | 9/1994 | Le |
| 5,350,988 A | 9/1994 | Le |
| 5,362,206 A * | 11/1994 | Westerman et al. ............ 417/12 |
| 5,425,623 A | 6/1995 | London et al. |
| 5,442,335 A | 8/1995 | Cantin et al. |
| 5,481,140 A | 1/1996 | Maruyama et al. |
| 5,481,225 A | 1/1996 | Lumsden et al. |
| 5,500,562 A | 3/1996 | Kelley |
| 5,506,484 A | 4/1996 | Munro et al. |
| 5,543,667 A | 8/1996 | Shavit et al. |
| 5,559,685 A | 9/1996 | Lauw et al. |
| 5,572,438 A | 11/1996 | Ehlers et al. |
| 5,600,549 A | 2/1997 | Cross |
| 5,602,462 A | 2/1997 | Stich |
| 5,602,689 A | 2/1997 | Kadlec et al. |
| 5,614,811 A | 3/1997 | Sagalovich et al. |
| 5,615,097 A | 3/1997 | Cross |
| 5,625,236 A | 4/1997 | Lefebvre et al. |
| 5,635,826 A | 6/1997 | Sugawara |
| 5,637,975 A | 6/1997 | Pummer et al. |
| 5,652,504 A | 7/1997 | Bangerter |
| 5,699,276 A | 12/1997 | Roos |
| 5,732,109 A | 3/1998 | Takahashi |
| 5,747,972 A | 5/1998 | Baretich et al. |
| 5,754,036 A | 5/1998 | Walker |
| 5,821,726 A | 10/1998 | Anderson |
| 5,828,200 A | 10/1998 | Ligman et al. |
| 5,828,671 A | 10/1998 | Vela et al. |
| 5,856,916 A | 1/1999 | Bonnet |
| 5,880,578 A | 3/1999 | Oliveira et al. |
| 5,909,138 A | 6/1999 | Stendahl |
| 5,936,855 A | 8/1999 | Salmon |
| 5,942,895 A | 8/1999 | Popovich et al. |
| 5,945,746 A | 8/1999 | Tracewell et al. |
| 5,946,203 A | 8/1999 | Jiang et al. |
| 5,994,898 A | 11/1999 | DiMarzio et al. |
| 6,005,367 A | 12/1999 | Rohde |
| 6,013,999 A | 1/2000 | Nola et al. |
| 6,055,171 A | 4/2000 | Ishii et al. |
| 6,104,737 A | 8/2000 | Mahmoudi |
| 6,118,239 A | 9/2000 | Kadah |
| 6,178,362 B1 | 1/2001 | Woolard et al. |
| 6,184,672 B1 | 2/2001 | Berkcan |
| 6,191,568 B1 | 2/2001 | Poletti |
| 6,198,312 B1 | 3/2001 | Floyd |
| 6,225,759 B1 | 5/2001 | Bogdan et al. |
| 6,259,610 B1 | 7/2001 | Karl et al. |
| 6,265,881 B1 | 7/2001 | Meliopoulos et al. |
| 6,274,999 B1 | 8/2001 | Fujii et al. |
| 6,297,610 B1 | 10/2001 | Bauer et al. |
| 6,325,142 B1 | 12/2001 | Bosley et al. |
| 6,326,773 B1 | 12/2001 | Okuma et al. |
| 6,346,778 B1 | 2/2002 | Mason et al. |
| 6,351,400 B1 | 2/2002 | Lumsden |
| 6,400,098 B1 | 6/2002 | Pun |
| 6,411,155 B2 | 6/2002 | Pezzani |
| 6,414,455 B1 | 7/2002 | Watson |
| 6,414,475 B1 | 7/2002 | Dames et al. |
| 6,426,632 B1 | 7/2002 | Clunn |
| 6,449,567 B1 | 9/2002 | Desai et al. |
| 6,459,606 B1 | 10/2002 | Jadric |
| 6,483,247 B2 | 11/2002 | Edwards et al. |
| 6,486,641 B2 | 11/2002 | Scoggins et al. |
| 6,489,742 B2 | 12/2002 | Lumsden et al. |
| 6,490,872 B1 | 12/2002 | Beck et al. |
| 6,495,929 B2 | 12/2002 | Bosley et al. |
| 6,528,957 B1 | 3/2003 | Luchaco |

(56) References Cited

U.S. PATENT DOCUMENTS

| | | |
|---|---|---|
| 6,534,947 B2 | 3/2003 | Johnson et al. |
| 6,548,988 B2 | 4/2003 | Duff, Jr. |
| 6,548,989 B2 | 4/2003 | Duff, Jr. |
| 6,553,353 B1 | 4/2003 | Littlejohn |
| 6,592,332 B1 | 7/2003 | Stoker |
| 6,599,095 B1 | 7/2003 | Takada et al. |
| 6,618,031 B1 | 9/2003 | Bohn, Jr. et al. |
| 6,643,149 B2 | 11/2003 | Arnet et al. |
| 6,650,554 B2 | 11/2003 | Darshan |
| 6,657,404 B1 | 12/2003 | Clark et al. |
| 6,662,821 B2 | 12/2003 | Jacobsen et al. |
| 6,664,771 B2 | 12/2003 | Scoggins et al. |
| 6,678,176 B2 | 1/2004 | Lumsden |
| 6,690,594 B2 | 2/2004 | Amarillas et al. |
| 6,690,704 B2 | 2/2004 | Fallon et al. |
| 6,718,213 B1 | 4/2004 | Enberg |
| 6,724,043 B1 | 4/2004 | Ekkanath Madathil |
| 6,747,368 B2 | 6/2004 | Jarrett, Jr. |
| 6,770,984 B2 | 8/2004 | Pai |
| 6,774,610 B2 | 8/2004 | Orozco |
| 6,781,423 B1 | 8/2004 | Knoedgen |
| 6,801,022 B2 | 10/2004 | Fa |
| 6,809,678 B2 | 10/2004 | Vera et al. |
| 6,836,099 B1 | 12/2004 | Amarillas et al. |
| 6,849,834 B2 | 2/2005 | Smolenski et al. |
| 6,891,478 B2 | 5/2005 | Gardner |
| 6,904,973 B2 | 6/2005 | Tieben |
| 6,912,911 B2 | 7/2005 | Oh et al. |
| 6,952,355 B2 | 10/2005 | Riggio et al. |
| 6,963,195 B1 | 11/2005 | Berkcan |
| 6,963,773 B2 | 11/2005 | Waltman et al. |
| 7,010,363 B2 | 3/2006 | Donnelly et al. |
| 7,019,474 B2 | 3/2006 | Rice et al. |
| 7,019,498 B2 | 3/2006 | Pippin et al. |
| 7,019,992 B1 | 3/2006 | Weber |
| 7,019,995 B2 | 3/2006 | Niemand et al. |
| 7,045,913 B2 | 5/2006 | Ebrahim et al. |
| 7,049,758 B2 | 5/2006 | Weyhrauch et al. |
| 7,049,976 B2 | 5/2006 | Hunt et al. |
| 7,061,189 B2 | 6/2006 | Newman, Jr. et al. |
| 7,062,361 B1 | 6/2006 | Lane |
| 7,068,184 B2 | 6/2006 | Yee et al. |
| 7,069,161 B2 | 6/2006 | Gristina et al. |
| 7,081,729 B2 | 7/2006 | Chang et al. |
| 7,091,559 B2 | 8/2006 | Fragapane et al. |
| 7,106,031 B2 | 9/2006 | Hayakawa et al. |
| 7,119,576 B1 | 10/2006 | Langhammer et al. |
| 7,123,491 B1 | 10/2006 | Kusumi |
| 7,136,724 B2 | 11/2006 | Enberg |
| 7,136,725 B1 | 11/2006 | Paciorek et al. |
| 7,157,898 B2 | 1/2007 | Hastings et al. |
| 7,164,238 B2 | 1/2007 | Kazanov et al. |
| 7,168,924 B2 | 1/2007 | Beck et al. |
| 7,188,260 B1 | 3/2007 | Shaffer et al. |
| 7,205,822 B2 | 4/2007 | Torres et al. |
| 7,211,982 B1 | 5/2007 | Chang et al. |
| 7,227,330 B2 | 6/2007 | Swamy et al. |
| 7,245,100 B2 | 7/2007 | Takahashi |
| 7,250,748 B2 | 7/2007 | Hastings et al. |
| 7,256,564 B2 | 8/2007 | MacKay |
| 7,259,546 B1 | 8/2007 | Hastings et al. |
| 7,263,450 B2 | 8/2007 | Hunter |
| 7,279,860 B2 | 10/2007 | MacKay |
| 7,288,911 B2 | 10/2007 | MacKay |
| 7,298,132 B2 | 11/2007 | Woolsey et al. |
| 7,298,133 B2 | 11/2007 | Hastings et al. |
| 7,301,308 B2 | 11/2007 | Aker et al. |
| 7,309,973 B2 | 12/2007 | Garza |
| 7,330,366 B2 | 2/2008 | Lee |
| 7,336,463 B2 | 2/2008 | Russell et al. |
| 7,336,514 B2 | 2/2008 | Amarillas et al. |
| 7,349,765 B2 | 3/2008 | Reaume et al. |
| 7,355,865 B2 | 4/2008 | Royak et al. |
| 7,358,724 B2 | 4/2008 | Taylor et al. |
| 7,378,821 B2 | 5/2008 | Simpson, III |
| 7,386,713 B2 | 6/2008 | Madter et al. |
| 7,394,397 B2 | 7/2008 | Nguyen et al. |
| 7,397,212 B2 | 7/2008 | Turner |
| 7,397,225 B2 | 7/2008 | Schulz |
| 7,412,185 B2 | 8/2008 | Hall et al. |
| 7,417,410 B2 | 8/2008 | Clark, III et al. |
| 7,417,420 B2 | 8/2008 | Shuey et al. |
| 7,436,233 B2 | 10/2008 | Yee et al. |
| 7,446,514 B1 | 11/2008 | Li et al. |
| 7,525,296 B2 | 4/2009 | Bilig et al. |
| 7,528,503 B2 | 5/2009 | Rognli et al. |
| 7,561,977 B2 | 7/2009 | Horst et al. |
| 7,602,136 B2 | 10/2009 | Garza |
| 7,605,495 B2 | 10/2009 | Achart |
| 7,615,989 B2 | 11/2009 | Kojori |
| 7,622,910 B2 | 11/2009 | Kojori |
| 7,667,411 B2 | 2/2010 | Kim |
| 7,693,610 B2 | 4/2010 | Ying |
| 7,719,214 B2 | 5/2010 | Leehey |
| 7,746,003 B2 | 6/2010 | Verfuerth et al. |
| 7,768,221 B2 * | 8/2010 | Boyadjieff et al. ........... 318/437 |
| 7,788,189 B2 | 8/2010 | Budike, Jr. |
| 7,791,326 B2 | 9/2010 | Dahlman et al. |
| 7,797,084 B2 | 9/2010 | Miwa |
| 7,848,897 B2 | 12/2010 | Williams, Jr. |
| 7,882,383 B2 | 2/2011 | May et al. |
| 7,902,788 B2 | 3/2011 | Garza |
| 7,911,173 B2 * | 3/2011 | Boyadjieff ................... 318/621 |
| 7,919,958 B2 | 4/2011 | Oettinger et al. |
| 7,977,842 B2 | 7/2011 | Lin |
| 8,004,255 B2 | 8/2011 | Lumsden |
| 8,085,009 B2 | 12/2011 | Lumsden |
| 8,085,010 B2 | 12/2011 | Lumsden |
| 8,120,307 B2 | 2/2012 | Lumsden |
| 8,333,265 B2 | 12/2012 | Kang et al. |
| 8,374,729 B2 | 2/2013 | Chapel et al. |
| 2001/0010032 A1 | 7/2001 | Ehlers et al. |
| 2002/0071405 A1 | 6/2002 | Kelley et al. |
| 2002/0079859 A1 | 6/2002 | Lumsden |
| 2002/0109477 A1 | 8/2002 | Ikezawa |
| 2003/0090362 A1 | 5/2003 | Hardwick |
| 2003/0181288 A1 | 9/2003 | Phillippe |
| 2004/0010350 A1 | 1/2004 | Lof et al. |
| 2004/0047166 A1 | 3/2004 | Lopez-Santillana et al. |
| 2004/0095237 A1 | 5/2004 | Chen et al. |
| 2004/0153170 A1 | 8/2004 | Santacatterina et al. |
| 2004/0181698 A1 | 9/2004 | Williams |
| 2004/0189265 A1 | 9/2004 | Rice et al. |
| 2004/0239335 A1 | 12/2004 | McClelland et al. |
| 2005/0033951 A1 | 2/2005 | Madter et al. |
| 2005/0068013 A1 | 3/2005 | Scoggins |
| 2005/0073295 A1 | 4/2005 | Hastings et al. |
| 2006/0038530 A1 | 2/2006 | Holling |
| 2006/0049694 A1 | 3/2006 | Kates |
| 2006/0103365 A1 | 5/2006 | Ben-Yaacov |
| 2006/0103549 A1 | 5/2006 | Hunt et al. |
| 2006/0125422 A1 | 6/2006 | Costa |
| 2006/0175674 A1 | 8/2006 | Taylor et al. |
| 2006/0276938 A1 | 12/2006 | Miller |
| 2007/0024250 A1 | 2/2007 | Simson, III |
| 2007/0024264 A1 | 2/2007 | Lestician |
| 2007/0037567 A1 | 2/2007 | Ungless |
| 2007/0069668 A1 | 3/2007 | MacKay |
| 2007/0071047 A1 | 3/2007 | Huang et al. |
| 2007/0211400 A1 | 9/2007 | Weiher et al. |
| 2007/0213776 A1 | 9/2007 | Brink |
| 2007/0244603 A1 | 10/2007 | Level |
| 2007/0279053 A1 | 12/2007 | Taylor et al. |
| 2007/0283175 A1 | 12/2007 | Marinkovic et al. |
| 2007/0290645 A1 | 12/2007 | Boyadjieff et al. |
| 2007/0300084 A1 | 12/2007 | Goodrum et al. |
| 2007/0300085 A1 | 12/2007 | Goodrum et al. |
| 2008/0005044 A1 | 1/2008 | Benya et al. |
| 2008/0043506 A1 | 2/2008 | Ozaki et al. |
| 2008/0049452 A1 | 2/2008 | Van Bodegraven |
| 2008/0104430 A1 | 5/2008 | Malone et al. |
| 2008/0116825 A1 | 5/2008 | Descarries et al. |
| 2008/0121448 A1 | 5/2008 | Betz et al. |
| 2008/0177678 A1 | 7/2008 | Di Martini et al. |

(56) References Cited

U.S. PATENT DOCUMENTS

| | | |
|---|---|---|
| 2008/0221737 A1 | 9/2008 | Josephson et al. |
| 2008/0272934 A1 | 11/2008 | Wang et al. |
| 2008/0281473 A1 | 11/2008 | Pitt |
| 2008/0290731 A1 | 11/2008 | Cassidy |
| 2008/0291607 A1 | 11/2008 | Braunstein et al. |
| 2009/0018706 A1 | 1/2009 | Wittner |
| 2009/0045804 A1 | 2/2009 | Durling et al. |
| 2009/0046490 A1 | 2/2009 | Lumsden |
| 2009/0051344 A1 | 2/2009 | Lumsden |
| 2009/0062970 A1 | 3/2009 | Forbes, Jr. et al. |
| 2009/0063228 A1 | 3/2009 | Forbes, Jr. |
| 2009/0083167 A1 | 3/2009 | Subbloie |
| 2009/0085545 A1 | 4/2009 | Shen et al. |
| 2009/0088907 A1 | 4/2009 | Lewis et al. |
| 2009/0094173 A1 | 4/2009 | Smith et al. |
| 2009/0105888 A1 | 4/2009 | Flohr et al. |
| 2009/0154206 A1 | 6/2009 | Fouquet et al. |
| 2009/0160267 A1 | 6/2009 | Kates |
| 2009/0189581 A1 | 7/2009 | Lawson et al. |
| 2009/0200981 A1 | 8/2009 | Lumsden |
| 2010/0001704 A1 | 1/2010 | Williams |
| 2010/0013427 A1 | 1/2010 | Kelley |
| 2010/0014989 A1 | 1/2010 | Tsuruta et al. |
| 2010/0033155 A1 | 2/2010 | Lumsden |
| 2010/0054001 A1 | 3/2010 | Dyer |
| 2010/0117588 A9 | 5/2010 | Kelley |
| 2010/0138066 A1 | 6/2010 | Kong |
| 2010/0145542 A1 | 6/2010 | Chapel et al. |
| 2010/0148866 A1 | 6/2010 | Lee et al. |
| 2010/0191385 A1 | 7/2010 | Goodnow et al. |
| 2010/0228398 A1 | 9/2010 | Powers et al. |
| 2010/0250590 A1 | 9/2010 | Galvin |
| 2010/0277955 A1 | 11/2010 | Duan |
| 2010/0283423 A1 | 11/2010 | Boyadjieff |
| 2010/0305771 A1 | 12/2010 | Rodgers |
| 2010/0320956 A1 | 12/2010 | Lumsden et al. |
| 2011/0080130 A1 | 4/2011 | Venkataraman |
| 2011/0121775 A1 | 5/2011 | Garza |
| 2011/0182094 A1 | 7/2011 | Lumsden et al. |
| 2012/0213645 A1 | 8/2012 | Lumsden et al. |

FOREIGN PATENT DOCUMENTS

| | | |
|---|---|---|
| EP | 0330477 A2 | 8/1989 |
| EP | 1650860 B1 | 8/2008 |
| EP | 2183849 B1 | 5/2010 |
| GB | 652558 A | 4/1951 |
| GB | 1046446 | 10/1966 |
| GB | 1512407 | 6/1978 |
| JP | 06-261594 | 9/1994 |
| JP | 2006-261594 | 9/1994 |
| JP | 11-007328 A | 1/1999 |
| JP | 2011-007328 A | 1/1999 |
| JP | 2011-007328 A | 1/1999 |
| JP | 2011-132155 | 5/1999 |
| JP | 11132155 A | 5/1999 |
| JP | 11-241687 A | 9/1999 |
| JP | 11-241687 A | 9/1999 |
| JP | 2011-241687 A | 9/1999 |
| JP | 2000-125548 A | 4/2000 |
| JP | 2001-245496 | 9/2001 |
| JP | 2001-245496 A | 9/2001 |
| JP | 2004-351492 | 12/2004 |
| JP | 2005-227795 | 8/2005 |
| JP | 2009535013 A | 9/2009 |
| JP | 2010-502533 A | 1/2010 |
| JP | 2010-502533 A | 1/2010 |
| KR | 10-2001-0006838 A | 1/2001 |
| KR | 10-2001-0006838 A | 1/2001 |
| KR | 10-2009-0009872 | 1/2009 |
| KR | 10-2009-0009872 A | 1/2009 |
| MX | 298359 | 2/2009 |
| MX | 303414 | 5/2010 |
| WO | WO-80/02895 | 12/1980 |
| WO | WO-91/03093 A1 | 3/1991 |
| WO | WO-92/16041 A1 | 9/1992 |
| WO | WO 00/66892 | 11/2000 |
| WO | WO 00-66892 | 11/2000 |
| WO | WO00/66892 A1 | 11/2000 |
| WO | WO-00-66892 A1 | 11/2000 |
| WO | WO 2006/021079 A1 | 3/2006 |
| WO | WO2006021079 A1 | 3/2006 |
| WO | WO 2008/008745 A2 | 1/2008 |
| WO | WO2008008745 A2 | 1/2008 |
| WO | WO-2008-051386 A2 | 5/2008 |
| WO | WO-2008-150458 A1 | 12/2008 |
| WO | WO 2010/114916 A1 | 10/2010 |
| WO | WO2010114916 A1 | 10/2010 |
| WO | WO2011/031603 A1 | 3/2011 |
| WO | WO 2012/030403 A1 | 3/2012 |
| WO | WO 2012/044289 A1 | 4/2012 |
| WO | WO 2012/050635 A1 | 4/2012 |
| ZA | 9804115 A | 5/1999 |

OTHER PUBLICATIONS

Written Opinion of the International Searching Authority for International Application No. PCT/US2010/047477, dated Oct. 15, 2010 (this corresponds with U.S. Appl. No. 12/873,510) (7 pages).

International Search Report for International Application No. PCT/US2008/009482, dated Nov. 6, 2008 (2 pages).

Written Opinion of the International Search Authority for International Application No. PCT/US2008/009482, dated Nov. 6, 2008 (11 pages).

International Search Report for International Application No. PCT/US2008/009483, dated Nov. 18, 2008 (2 pages).

Written Opinion of the International Searching Authority for International Application No. PCT/US2008/009483, dated Nov. 18, 2008 (6 pages).

International Search Report for International Application No. PCT/US2008/009533, dated Oct. 6, 2008 (2 pages).

Written Opinion of the International Search Authority for International Application No. PCT/US2008/009533, dated Oct. 6, 2008 (5 pages).

International Search Report for International Application No. PCT/US2008/010720, dated Nov. 25, 2008 (2 pages).

Written Opinion of the International Search Authority for International Application No. PCT/US2008/010720, dated Nov. 25, 2008 (4 pages).

International Search Report for International Application No. PCT/US2008/009393, dated Oct. 6, 2008 (3 pages).

Written Opinion of the International Search Authority for International Application No. PCT/US2008/009393, dated Oct. 6, 2008 (13 pages).

Frick, Vincent, et al., "CMOS Microsystem for AC Current Measurement with Galvanic Isolation," IEEE Sensors Journal, vol. 3, No. 6, pp. 752-760, 2003 IEEE (9 pages).

PCT Notification of Transmittal of the International Search Report and the Written Opinion of the International Searching Authority, or the Declaration, from the International Searching Authority Korea (ISA/KR) Korean Intellectual Property Office mailed Sep. 7, 2011; corresponding to U.S. Appl. No. 12/967,128, now Publication No. US2011/0080130 A1 (9 pages).

Extended European Search Report, European Patent Office, for Application No. 08795029.1-1242/2183849 PCT/US2008009393 dated Aug. 1, 2011; corresponding U.S. Appl. No. 12/185,442, now Publication No. US2009/0046490 A1 (10 pages).

PCT Notification of Transmittal of The International Search Report and the Written Opinion of the International Searching Authority, or the Declaration, from the International Searching Authority Korea (ISA/KR) Korean Intellectual Property Office mailed Jun. 29, 2011 corresponding to U.S. Appl. No. 12/893,539 (not yet published) (8 pages).

English language translation of Japanese Patent JP-11-007328 A above (13 pages).

English language translation of Japanese Patent JP 11241687 above (16 pages).

(56) References Cited

OTHER PUBLICATIONS

English language translation of Japanese Patent JP 2001-245496 above (14 pages).
English language translation of Jasanese Patent JP 2010-502533 A above (16 pages).
PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/185,442, now Publication No. US2009/0046490 A1 (15 pages).
Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003; (9 pages).
PCT Notification Concerning Transmittal of International Preliminary Report on Patentability mailed Feb. 20, 2010 from the International Bureau of WIPO; corresponding to U.S. Appl. No. 12/185,442, now Publication No. US2009/0046490 A1 (14 pages).
PCT Notification of Transmittal of The International Search Report and the Written Opinion of the International Searching Authority, or the Declaration, from the International Searching Authority USA (ISA/US) mailed Nov. 6, 2008; corresponding to U.S. Appl. No. 12/187,136, now Publication No. US2009/0051344 A1 (15 pages).
PCT Notification of Transmittal of The International Search Report and the Written Opinion of the International Searching Authority, or the Declaration, from the International Searching Authority USA (ISA/US) mailed Nov. 18, 2008; corresponding to U.S. Appl. No. 12/187,186, now Publication No. US2009/0200981 A1 (9 pages).
PCT Notification of Transmittal of The International Search Report and the Written Opinion of the International Searching Authority, or the Declaration, from the International Searching Authority USA (ISA/US) mailed Oct. 6, 2008; corresponding to U.S. Appl. No. 12/187,805, now Publication No. US2010/0033155 A1 (7 pages).
PCT Notification Concerning Transmittal of International Preliminary Report on Patentability mailed Feb. 17, 2011 from the International Bureau of WIPO; International Application No. PCT/US2008/009533 corresponding to U.S. Appl. No. 12/187,805, now Publication No. US2010/0033155 A1 (6 pages).
PCT Notification of Transmittal of The International Search Report and the Written Opinion of the International Searching Authority, or the Declaration, from the International Searching Authority USA (ISA/US) mailed Nov. 25, 2008; corresponding to International Application No. PCT/US08/10720 and UU.S. Appl. No. 12/207,913, now Publication No. US2010/0013427 A1 (8 pages).
PCT Notification Concerning Transmittal of International Preliminary Report on Patentability mailed Mar. 25, 2010 from The International Bureau of WIPO; corresponding to International Application No. PCT/US2008/1010720 and U.S. Appl. No. 12/207,913, now Publication No. US2010/0013427 A1 (7 pages).
English language translation of Official Action from the Eurasian Patent Office pertaining to Application No. 201070369/(OFE/1004/0111) and original Office Action both corresponding to PCT Application No. US 2008/010720 dated Apr. 26, 2011 and U.S. Appl. No. 12/207,913, now Publication No. US2010/0013427 A1 (2 pages).
PCT Notification of Transmittal of The International Search Report and the Written Opinion of the International Searching Authority, or the Declaration, from the International Searching Authority USA (ISA/US), mailed Oct. 15, 2010; corresponding to U.S. Appl. No. 12/873,510, now Publication No. US2010/0320956 A1 (11 pages).
International Search Report and Written Opinion for International Application No. PCT/US2012/035844 dated Nov. 16, 2012 corresponding to US2012/0213645 A1 (8 pages).
European Patent Office grant of patent dated Jun. 4, 2012, European Patent Application No. 08795029.1-1242 (61 pages).
European Patent Application No. 08795029.1-1242 (2 pages).
Office Action from the Eurasian Patent Office dated May 28, 2012, Eurasian Patent Application No. 201070276/31 (English translation, 2 pages).
Response to NPL 3L above including reference numbers for 96 claims as filed in U.S. Appl. No. 13/331,757 on or between Sep. 20 and 27, 2012 (12 pages).
Response to NPL HH above dated Jul. 9, 2012 amending claims to claims 1-77 of US Patent No. 8,085,009 (24 pages).
Frick, Vincent, Member, IEEE; Hebrard, Luc, Member, IEEE; Poure, Phillippe; Anstotz, Freddy; Braun, Francis; "CMOS Microsystem for AC Current Measurement with Galvanic Isolation"; IEEE Sensors Journal, vol. 3, No. 6, Dec. 2003.
Written Opinion of the International Searching Authority for International Application No. PCT/US2008/009393, dated Oct. 6, 2008 (13 pages).
Kolomoitsev, K.V.; "Voltage Control with the Aid of a Booster [Three Phase Supply Lines]"; Promyshlennaya Energetika, n. 7, 38-9, Jul. 1979 (Language: Russian); ISSN: 0033-1155; Country of Publication: USSR; Abstract: Describes techniques of voltage control, or voltage maintenance, at the terminals of consumers, in 127/220 or 220/380 V supply lines. This is achieved using voltage boosters, consisting of regulating autotransformers and voltage boosting transformers, whose secondary windings are connected into the a.c. line. Voltage regulation is achieved by changing the additional e.m.f. in the windings of a boosting transformer with the aid of regulating autotransformers. Two-sided regulation at the output of a three-phase 220/380 V regulator is obtained by connecting the primary winding of the boosting transformer to the middle output and to the moving contact of the compensating regulating autotransformer.
First Non-Final Office Action mailed Feb. 3, 2011, U.S. Appl. No. 12/187,186, filed Aug. 6, 2008, (19 pages).
Response and Amendment to First Non-Final Office Action mailed Apr. 8, 2011, U.S. Appl. No. 12/187,186, filed Aug. 6, 2008, (32 pages).
Final Office Action mailed Jun. 13, 2011, U.S. Appl. No. 12/187,186, filed Aug. 6, 2008, (23 pages).
PCT Notification of Transmittal of The International Search Report and the Written Opinion of the International Searching Authority, or the Declaration, from the International Searching Authority USA (ISA/US) mailed Jan. 2, 2012; corresponding to U.S. Appl. No. 13/026,931, now Publication No. US2011/0182094 A1 (9 pages).
Notification of the First Office Action dated Dec. 23, 2011, State Intellectual Property Office of People's Republic of China; Chinese National Phase of PCT Application No. 200880111387.0, with English translation (19 pages).
Substantive Examination Report Stage 1, Indonesian National Phase of PCT Application No. W-00201000702 with English translation (3 pages).
Response to extended European Search Report of Aug. 1, 2011 and Response to Communication pursuant to Rules 70(2) and 70A(2) EPC of Aug. 18, 2011, dated Feb. 24, 2012, European Patent Application No. 08795029.1 (12 pages).
Office Action from Mexican Patent Office dated Oct. 20, 2011 for Mexican National Phase of PCT Application No. MX/a/2010/001755 (2 pages).
Response dated Mar. 9, 2012 conforming Mexican claims to corresponding US Patent No. 8,085,009 B2 (50 pages).
Notice of Allowance from Mexican Patent Office dated Mar. 15, 2012 resulting from Response (1 page).
Office Action from Eurasian Patent Office dated Feb. 21, 2011 for Application No. 201070276/31 filed Mar. 12, 2010 with English translation (2 pages).
Response dated May 10, 2011 (17 pages).
Notice of Allowance from Eurasian Patent Office dated Sep. 13, 2011 for Application No. 201070276/31 filed Mar. 12, 2010 with English translation as a result (2 pages).
Response above dated Jan. 13, 2012 adding new claims of U.S. Appl. No. 13/331,757 (16 pages).
Response and Amendment to Aug. 3, 2011 Non-Final Office Action filed Oct. 31, 2011, U.S. Appl. No. 12/207,913 (23 pages).
Response to Mexican Office Action dated Feb. 6, 2012 for Application No. MX/a/2010/002859, distinguishing US 6,274,999 B1 to Fuji, et al. and US 5,828,200 to Ligman, et al. while conforming the Mexican claims to corresponding U.S. Appl. No. 12/207,913 (21 pages).

(56) References Cited

OTHER PUBLICATIONS

Notice of Allowance from Mexican Patent Office dated Apr. 24, 2012 for Application No. MX/a/2010/002859 filed Sep. 15, 2008 (2 pages).
Office Action from Mexican Patent Office dated Nov. 25, 2011 for Application No. MX/a/2010/002859 filed Sep. 15, 2008 (2 pages).
Notification of the necessity to submit additional materials and arguing some claims lack of novelty in view of US 5,828,200 to Ligman et al. (Abstract, col. 3, Ins. 1-65, and claims and description relating to Figs. 1 and 3B) and US 6,449,567 to Desai from Eurasian Patent Office dated Apr. 26, 2011 for Application No. 201070369/(OFE/1004/0111) filed Apr. 13, 2010 with English translation (2 pages).
Notification of Eurasian Patent Office Readiness to Grant Patent dated Dec. 15, 2011 for Application No. 201070369/ (OFE/1004/0111) filed Apr. 13, 2010 with English translation (2 pages).
Response dated Apr. 3, 2012 for Eurasian Application No. 201070369 (16 pages).
Office Action from the Indonesian Patent Office (Substantive Examination Report Stage 1) for Application No. W-00201000893 with English translation arguing lack of novelty in view of International Search Authority for PCT/US2008/10720 (2 pages).
Response dated Mar. 5, 2012 for Application No. W-00201000893 with English translation distinguishing US 5,828,200 to Ligman and US 6,449,567 to Desai (15 pages).
Final Office Action in U.S. Appl. No. 12/207,913 mailed from the USPTO on Mar. 14, 2012 relying on US 6,274,999 to Fuji and US 6,489,742 to Lumsden (17 pages).
Extended European Search Report from the European Patent Office in Application No. 08830045.4 dated Aug. 22, 2012 (8 pages).
Notice of Reasons for Refusal of Patent Application No. 2010-524881 mailed from the Japanese Patent Office on Aug. 28, 2012 relying on Japanese Unexamined Patent Publication HE16-261594 with English translation (6 pages).
Response to final Office Action for U.S. Appl. No. 12/207,913, filed with the USPTO on Sep. 13, 2012 (32 pages).
Sul, S K and Park, M H: "A novel Technique for Optimal Efficiency Control of a Current-Source Inverter-Fed Induction Motor", IEEE Transactions on Power Electronics, vol. 3, No. 2, Apr. 1, 1988, pp. 192-199, XP002063874, ISSN: 0885-8993, DOI: 10.1109/63.4349, p. 2, left-hand column, line 9—p. 4, left-hand column, line 29; Figs. 4-8 (8 pages).
Flemming Abrahamsen, et al.: "On the Energy Optimized Control of Standard and High-Efficiency Induction Motors in CT and HVAC Applications", IEEE Transactions on Industry Applications, IEEE Service Center, Piscataway, NJ US, vol. 34, No. 4, Aug. 1, 1998, XP011022398, ISSN: 0093-9994, p. 4, right-hand column, line 11—p. 5, left-hand column, line 5; Fig. 9 (10 pages).
Office Action issued by the State Intellectual Property Office (SIPO) on Apr. 28, 2012 for Chinese Application No. 200880115946 (PCT/US2008/010720) relying on US 6,274,999 B1 to Fuji, with English translation (21 pages).
Office Action issued by the Colombian Patent Office in Application No. 10.042.683 (PCT/US2008/010720) relying on US 6,274,999 B1 to Fuji and US 6,489,742 to Lumsden, with English translation (24 pages).
Office Action from Eurasian Patent Office dated Aug. 16, 2012 for Application No. 201070369/31 with English translation (4 pages).
Patent Cooperation Treaty Notification Concerning Transmittal of International Preliminary Report on Patentability (Chapter I of the Patent Cooperation Treaty) (PCT Rule 44bis.1(c) mailed Mar. 14, 2013 for PCT Application corresponding to International Application No. PCT/US2011/020326, filed on Jan. 6, 2011, and published as WO 2012/030403 on Mar. 2, 2012, corresponding to U.S. Appl. No. 12/967,128 published as US-2011/0080130 A1 (6 pages).
Office Action from the U.S. Patent and Trademark Office mailed Feb. 22, 2013 corresponding to U.S. Appl. No. 12/207,913, republished as US-2010/0117588 A1 (48 pages).
Office Action from the State Intellectual Property Office mailed Mar. 29, 2013 for Chinese Application No. 200880115946.5 with English translation corresponding to U.S. Appl. No. 12/207,913, republished as US-2010/0117588 A1 (19 pages).
Response to Office Action from the State Intellectual Property Office dated Mar. 29, 2013 for Chinese Application No. 200880115946.5 corresponding to U.S. Appl. No. 12/207,913, republished as US-2010/0117588 A1 (13 pages).
Notice of Allowance form the U.S. Patent and Trademark Office mailed Jun. 11, 2013 for U.S. Appl. No. 13/451,041, published as US-2012/0213645 A1 (49 pages).
Response to Office Action from the Colombian Patent Office dated Dec. 27, 2012 for Colombian Application No. 10.042.683 with English translation corresponding to U.S. Appl. No. 12/207,913, republished as US-2010/0117588 A1 (55 pages).
Response to Office Action from Eurasian Patent Office dated Dec. 17, 2012 for Application No. 201070369/31 corresponding to U.S. Appl. No. 12/207,913, republished as US-2010/0117588 A1 (15 pages).
Notification of the necessity to Submit Additional Materials from the Eurasian Patent Office dated Apr. 1, 2013 for Application No. 201070369/31 with English translation corresponding to U.S. Appl. No. 12/207,913, republished as US-2010/0117588 A1 (4 pages).
Response to Supplementary European Search Report from the European Patent Office mailed on Aug. 22, 2012, filed on Mar. 18, 2013 regarding European Application No. 08630045.4 corresponding to U.S. Appl. No. 12/207,913, republished as US-2010/0117588 A1 (21 pages).
Notice of Reasons for Refusal of Patent Application No. 2010-524881 mailed from the Japanese Patent Office on Aug. 28, 2012 with English translation, relying on Japanese Unexamined Patent Publication HEI6-261594; (6 pages).
Response to $2^{nd}$ Office Action for Chinese Patent Application No. 200880111387.0 filed on Jan. 8, 2013 corresponding to U.S. Appl. No. 12/185,442, issued as US Patent No. 8085009B2 (25 pages).
Voluntary Amendment filed on Mar. 21, 2013 for Chinese Patent Application No. 200880111387.0 filed on Jan. 8, 2013 corresponding to U.S. Appl. No. 12/185,442, issued as US Patent No. 8085009B2 (22 pages).
Notification on Grant of Patent Right for Invention mailed on Apr. 9, 2013 for Chinese Patent Application No. 200880111387.0 filed on Jan. 8, 2013 with English translation corresponding to U.S. Appl. No. 12/185,442, issued as US Patent No. 808500982 (4 pages).
Response to Office Action for Colombian Patent Application No. 10.029.658 filed on Feb. 20, 2013 corresponding to U.S. Appl. No. 12/185,442, issued as US Patent No. 8085009B2 (42 pages).
Office Action from the U.S. Patent and Trademark Office mailed Mar. 13, 2013 corresponding to U.S. Appl. No. 12/873,510, published as US-2010/0320956 A1 on Dec. 23, 2010, which is a continuation-in-part of U.S. Appl. No. 12/207,913, republished as US-2010/0117588 A1 (15 pages).
International Search Report for International Application No. PCT/US2010/047477 mailed Mar. 22, 2012 corresponding to U.S. Appl. No. 12/873,510, published as US-2010/0320956 A1 (9 pages).
Voluntary Amendment filed on Nov. 9, 2012 for Chinese Patent Application No. 201080039849.X corresponding to U.S. Appl. No. 12/873,510, republished as US-2010/0320956 A1 (8 pages).
Office Action from the U.S. Patent and Trademark Office mailed Feb. 26, 2013 corresponding to U.S. Appl. No. 12/893,539, published as US-2012/0075896 A1 (7 pages).
International Search Report for International Application No. PCT/US2010/050714 mailed Apr. 11, 2013 corresponding to U.S. Appl. No. 12/893,539, published as US-2012/0075896 A1 (5 pages).
Office Action from the U.S. Patent and Trademark Office mailed Apr. 10, 2013 corresponding to U.S. Appl. No. 13/026,931 (11 pages).
Notice of Allowance from the U.S. Patent and Trademark Office mailed Jun. 11, 2013 corresponding to U.S. Appl. No. 12/967,128 (11 pages).
Office Action from the U.S. Patent and Trademark Office mailed Aug. 17, 2012 corresponding to U.S. Appl. No. 13/331,757 (14 pages).
Response to Office Action from the U.S. Patent and Trademark Office mailed Aug. 17, 2012, filed on Nov. 15, 2012 corresponding to U.S. Appl. No. 13/331,757 (26 pages).
Final Office Action from the U.S. Patent and Trademark Office mailed Feb. 27, 2013 corresponding to U.S. Appl. No. 13/331,757 (45 pages).

(56) References Cited

OTHER PUBLICATIONS

Response to Office Action from the Eurasian Patent Office filed on Apr. 19, 2013 corresponding to U.S. Appl. No. 13/331,757 (13 pages).

Sul, S K and Park, M H: "A novel Technique for Optimal Efficiency Control of a Current-Source Inverter-Fed Induction Motor", IEEE Transactions on Power Electronics, vol. 3, No. 2, Apr. 1, 1988, pp. 192-199, XP002063874, ISSN: 0885-8993, DOI: 10.1109/63.4349, p. 2, left-hand column, line 9—p. 4, left-hand column, line 29; Figs. 4-8 (8 pages); retrieved from IEEE databank attached, considered to be particularly relevant if taken alone, (16 pages).

Flemming Abrahamsen, et al.: "On the Energy Optimized Control of Standard and High-Efficiency induction Motors in CT and HVAC Applications", IEEE Transactions on Industry Applications, IEEE Service Center, Piscataway, NJ, US, vol. 34, No. 4, Jul./Aug. 1998, XP011022398, ISSN: 0093-9994, p. 4, right-hand column, line 11—p. 5, left-hand column, line 5; Fig. 9 (10 pages); ); retrieved from IEEE databank attached, considered to be particularly relevant if taken alone, (20 pages).

International Search Report for International Application No. PCT/US2011/032840, mailed Apr. 11, 2013 corresponding to U.S. Appl. No. 13/026,931, published as US 2011-0182094 A1 (6 pages).

English language Abstract and English language translation of Japanese Unexamined Patent Publication HEI6-261594; (9 pages).

* cited by examiner

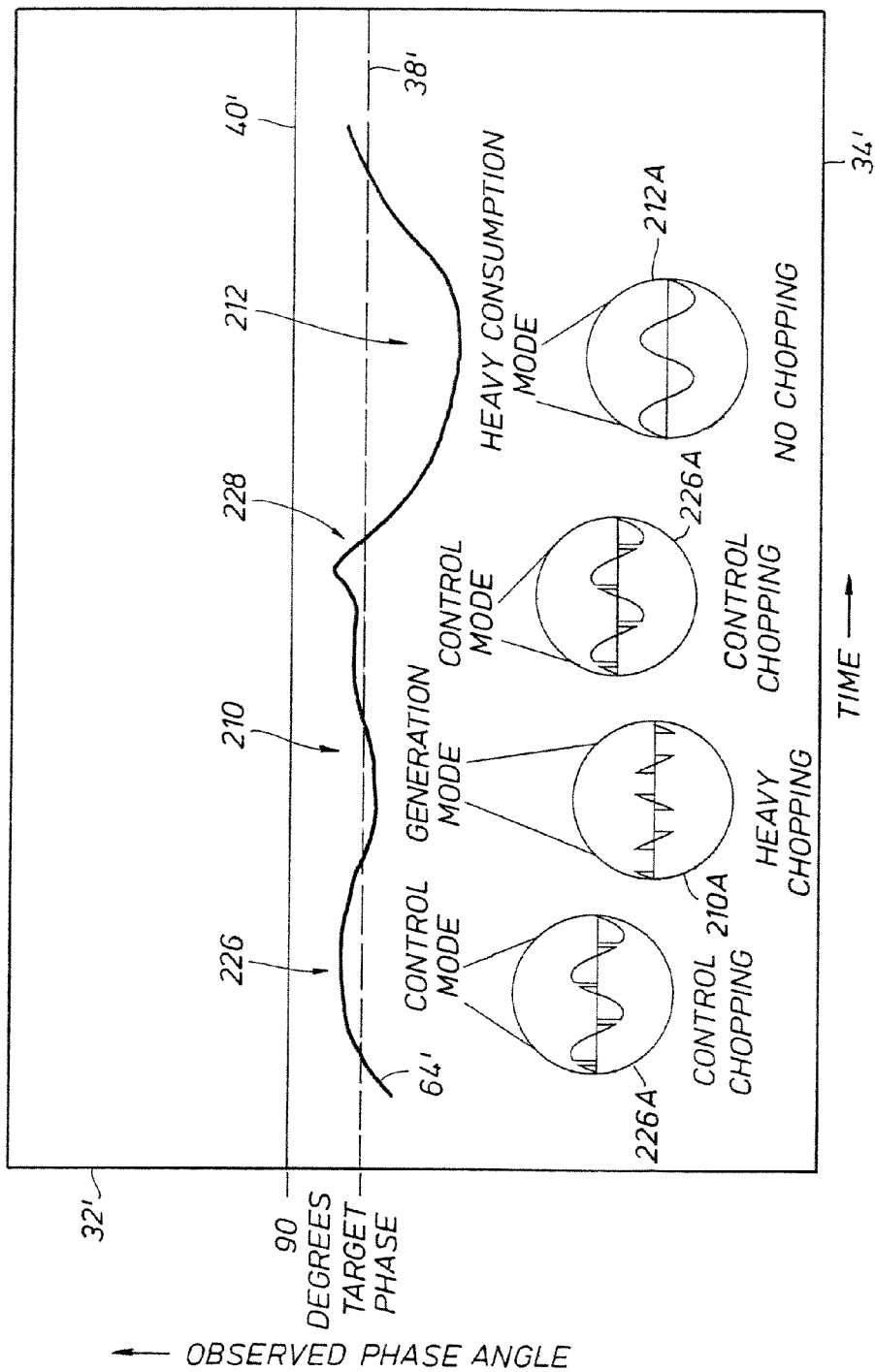

ENERGY SAVING SYSTEM AND METHOD FOR DEVICES WITH ROTATING OR RECIPROCATING MASSES

CROSS-REFERENCE TO RELATED APPLICATIONS

This application claims the benefit of U.S. Provisional Application No. 61/240,399 filed Sep. 8, 2009, which application is hereby incorporated by reference for all purposes in its entirety. This application is also a continuation-in-part of co-pending U.S. application Ser. No. 12/207,913 filed on Sep. 10, 2008, which claims the benefit of U.S. Provisional Application 61/135,402 filed on Jul. 21, 2008 and U.S. Provisional Application 60/993,706 filed on Sep. 14, 2007, all of which applications are hereby incorporated by reference for all purposes in their entirety.

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

1. Field of the Invention

This invention relates to electric motors used to operate pump jacks and other devices with rotating or reciprocating masses.

2. Description of the Related Art

A pump jack is an above ground driving device for a reciprocating piston pump installed downhole in an oil well. The pump jack mechanically lifts liquid out of the well when there is not enough bottom hole pressure for the liquid to flow by itself to the surface. The pump jack is often powered by an electric motor that receives electrical power from a electric utility grid. A pump jack converts the rotary mechanism of the motor to a vertical reciprocating motion to drive the downhole pump. There are many different designs of pump jacks, including, but not limited to, conventional, the Lufkin Mark II, beam-balanced, air-balanced, slant hole and conventional portable. Pump jacks are available from many different suppliers, including Lufkin Industries, Inc. of Lufkin, Tex. and Cook Pump Company of Coffeyville, Kans.

The pump jack electric motor usually rotates a set of pulleys to a gear system or transmission, which in turn drives a pair of cranks or crank arms. For a typical conventional pump jack design, the cranks raise and lower an end of a lever or beam, known as a "walking beam," that is pivoted on a sampson post or A-frame. A curved metal box known as a "horse head" is on the other end of the walking beam from where the crank arms are connected with the beam. A counterweight or reciprocating mass is typically attached to one end of the cranks. A pitman arm usually spans between the counterweight and the end of the walking beam opposite the horse head. A cable connects the horse head to a vertical polished rod, which is connected to the vertical string of tubulars or sucker rods running to the downhole pump.

The counterweight assists the motor in lifting the string of sucker rods or tubular string. When the motor lifts the counterweight upward, the horse head moves downward, pushing the sucker rods or tubular string downward. After the counterweight reaches the top of its rotation, it swings around and assists the motor to rotate the walking beam in the opposite direction using the counterweight's momentum and mass (kinetic energy). When the counterweight is free-falling downward from its uppermost position, the horse head moves upward, lifting the string of sucker rods upward. U.S. Pat. No. 4,051,736 proposes an improved pump jack for reciprocating an oil well pump.

Although there are different downhole pump designs, downhole pumps have traditionally comprised a plunger or piston reciprocating within a pump barrel located at or near the end of the production tubing. Two independent valves typically accomplish the pumping action. A standing check valve may be secured in the pump barrel beneath the piston, and the piston may include a traveling check valve. The upstroke of the piston opens the standing valve, and draws fluid into the pump barrel as the traveling valve remains closed. The downstroke of the piston opens the traveling valve and forces upward the fluid from the pump barrel as the standing barrel remains closed. U.S. Pat. Nos. 3,578,886; 4,173,451; and 6,904,973 propose downhole pumps.

It is well known that electric motors can enter an energy generation mode of operation. For an electric motor used with a pump jack, an energy generation mode can occur at any time during the rotation of the counterweight, depending on the condition of the balance between the counterweight and the tubular or rod string. The condition of the balance may fluctuate from pumping stroke to stroke, depending on the amount and composition of fluid being lifted by the rod string in each stroke. The polished rod and attached sucker rod or tubular string may be moving upwards or downwards in the energy generation mode.

A well owner must pay his electrical bill based upon the amount of power the pump jack motor consumes. The amount of energy consumed is measured by an energy meter. In the past, the amount of power consumed was measured by an analog electricity meter. Many digital electricity meters are now used. The energy meter, whether of analog or digital design, may be configured, at the discretion of the utility company, to allow or prevent crediting the customer for generated energy that is supplied back to the power grid. A pump jack system is such an inefficient generator that the quantity of consumed energy required to produce any generation significantly exceeds the generated energy. Therefore, regardless of whether the utility company credits generated energy, it is always beneficial to the customer to avoid energy generation.

During periods of generation, a motor will attempt to attain a voltage that exceeds the utility's line voltage, thereby causing current to flow in the opposite direction. The load provided by the utility grid serves as a brake, limiting the acceleration of the motor that would have otherwise occurred. This braking action of the motor prevents the falling weights of the pump jack from developing additional kinetic energy that might have assisted the pumping action. This converted kinetic energy could have served as an alternative to electrical energy from the utility grid.

In the past, engineers have tried unsuccessfully to save significant amounts of energy by turning off the pump jack electric motor during a portion of the pump jack cycle that may have included a period of generation. This has been attempted with various mechanical switches and relays. However, the parameters of the downhole pumps and wells vary over time, so these mechanical solutions have not worked.

Fluid flow in the well may vary as the well fills, and then "pumps off." In some cases the volume of fluid pumped may change from one stroke to the next. The changing volumes, densities, viscosities, weights, and other properties of materials and/or fluids pumped, such as gas, oil, water, and slurry, may greatly alter the combined weight of the rod string and the column of fluid, thereby affecting the balance of the system and the demand on the motor. In some wells the tubular strings may be thousands of feet in length. The influx of different fluids into the well over time will significantly impact the operation of the motor.

With the introduction of the microprocessor, it became possible to turn off the electric motor by observing the current and voltage. However, the problem was knowing when to turn the electric motor back on. Various open-loop time delays were unsuccessfully attempted in the past. The microprocessor solutions also failed since the parameters of the downhole pumps and wells vary over time.

U.S. Pat. No. 6,489,742 proposes a motor controller that includes power conveyance to an induction motor with a digital signal processor that calculates and optimizes supply of current for existent motor loading from a power supply and main voltage through a control element.

Pub. No. U.S. 2009/0046490 proposes an IGBT/FET-based energy savings device, system and method wherein a predetermined amount of voltage below a nominal line voltage and/or below a nominal appliance voltage is saved. Pub. No. U.S. 2009/0051344 proposes a TRIAC/SCR-based energy savings device, system and method wherein a predetermined amount of voltage below a nominal line voltage and/or below a nominal appliance voltage is saved. Pub. No. U.S. 2009/0200981 proposes a system and method for providing constant loading in AC power applications wherein at least one turn-on point of at least one half cycle of a modulating sine wave is determined, at east one turn-off point of the at least one half cycle of the modulating sine wave is determined, and at least one slice located between the at least one turn-on point and the at least one turn-off point in removed. Pub. No. U.S. 2010/0033155 proposes a power supply for IGBT/FET drivers that provides separated, isolated power to each IGBT/FET driver.

Proportional-integral-derivative (PID) control is a widely used technique applied to control algorithms and feedback mechanisms. A PID controller, as it is generally referred to, calculates a value based upon an "error." Typically, the "error" is calculated as the difference between a measured process variable and a desired set point or target value. The PID controller attempts to minimize the error by adjusting the process control variables. In essence, the PID controller is a digital filter that has proportional, integral, and derivative parameters. The proportional value determines the reaction to the current error, the integral value determines the reaction based on the sum of the recent errors, and the derivative value determines the reaction based on the rate at which the error has been changing.

The above discussed U.S. Pat. Nos. 3,578,886; 4,051,736; 4,173,451; 6,489,742; and 6,904,973; and Pub. Nos. U.S. 2009/0046490; 2009/0051344; 2009/0200981; and 2010/0033155 are incorporated herein by reference for all purposes in their entirety.

A need exists to efficiently manage the energy usage of a pump jack electric motor, particularly during the energy generation mode.

BRIEF SUMMARY OF THE INVENTION

A closed loop motor controller system reduces the supply voltage to a pump jack electric motor when the motor would be generating energy in open loop mode, when the phase angle between the voltage and current would be greater than 90 degrees. By reducing the supply voltage to the motor, the observed phase angle between voltage and current may be reduced to a value below 90 degrees. Under these conditions, the motor is still not consuming energy. Through pulse width modulation techniques, the real power component may be reduced virtually to zero, leaving a reactive component greater than zero. By allowing some current flow, primarily of a reactive nature, an observable feedback parameter may be used in the closed loop control system as an indication of the motor load condition, to which the motor controller may react, allowing power to be supplied when needed. Similarly, the closed loop motor controller system may achieve further energy savings by reducing the supply voltage to the motor when the motor is lightly loaded and consuming energy. By minimizing or eliminating energy that would otherwise be consumed by the system, energy savings may result both from reduction of the supply voltage to the motor and from the minimization or elimination of the braking action from the utility grid on the motor. The motor and system will speed up, allowing the natural kinetic energy of the cyclic motion to perform part of the pumping action.

A target phase angle may be supplied either as a constant for all motor loads, or as a variable function of the motor load at any instant. The target phase angle may be equal to or less than 90 degrees, although a target phase angle greater than 90 degrees is also contemplated. When the motor is generating or consuming energy, and the observed phase angle in open loop mode would be greater than the target phase angle, the system may reduce the supply voltage until the observed phase angle is substantially the target phase angle. Any further reduction in the observed phase angle below the target phase angle may be interpreted as an increase in motor load, such as during the energy consumption mode, to which the system may respond by increasing the supply voltage until the target phase angle is once again reached. The necessary information may be computed from the observed phase angle between the voltage and current consumed by the motor.

BRIEF DESCRIPTION OF THE DRAWINGS

A better and further understanding of the present invention can be obtained with the following detailed descriptions of the various disclosed embodiments in the drawings in which like parts are given like reference numerals, and wherein:

FIG. 32D is the plot of FIG. 31 illustrating the periods when heavy chopping, light chopping, and no chopping may occur.

DETAILED DESCRIPTION OF THE INVENTION

Figure 1:
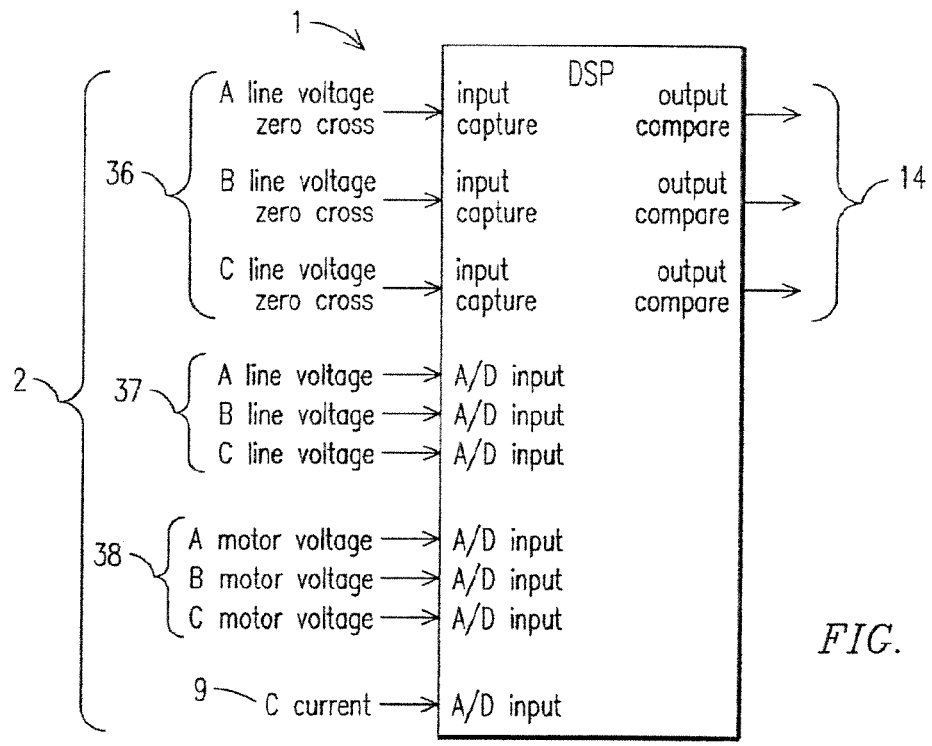
FIG. 1 is a block diagram of a digital signal processor (DSP) with hardware inputs and outputs.

With reference to FIG. 1, a block diagram of a digital signal processor (DSP) 1 and hardware inputs and outputs is shown. The DSP 1 can observe the operational characteristics of a motor and make corrections to root mean square (RMS) voltage for the motor that is running and under closed loop control. Hardware inputs 2 capture phase zero crossing inputs 36, phase line voltage 37, phase motor voltage 38 and current 9 and passed through the DSP 1 for processing and then onto power control devices through the power control device outputs 14.

Figure 2:
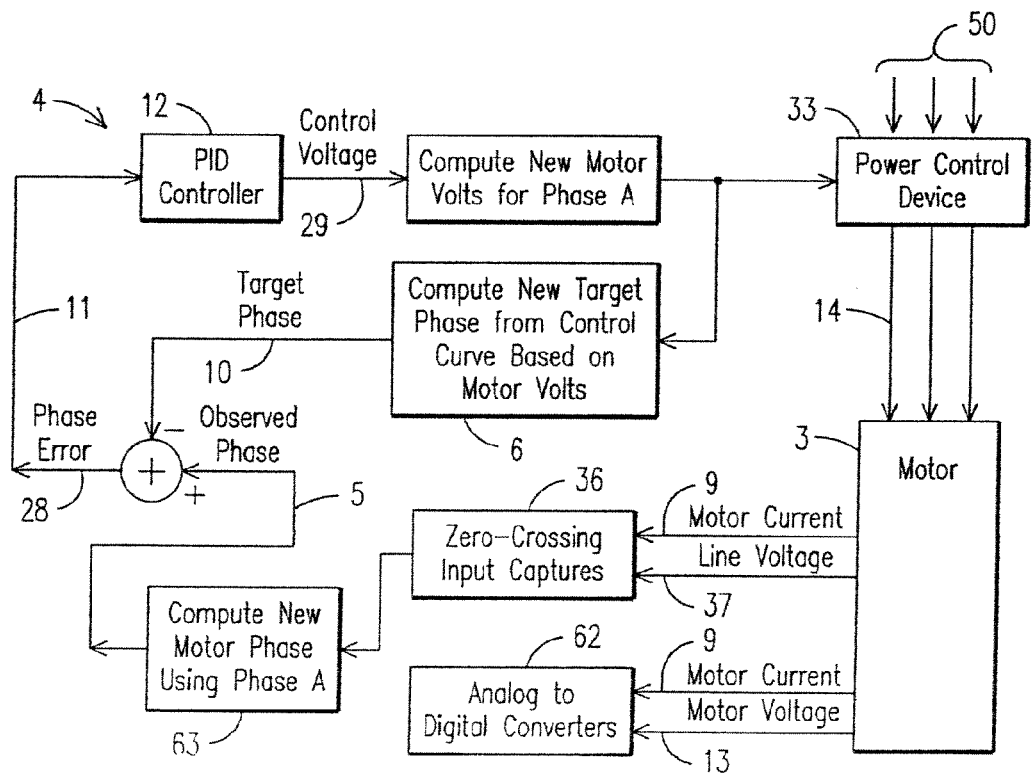
FIG. 2 is a block diagram of a DSP-based motor controller.

Referring now to FIG. 2, a block diagram of a system and method of the DSP-based motor controller 4 is shown. First, the motor controller 4 reads the voltages 37 of each phase A, B and C and current 9 to capture the zero-crossing inputs 36. At this point voltage 13 and current 9 may be converted from analog to digital using converters 62. Next, computations 63 of motor phase angle for each phase are calculated to yield an observed phase angle 5. Next, a target phase angle 10 which has been derived from a preprogrammed control line 6 is compared to the observed phase angle 5. The difference between the target phase angle 10 and observed phase angle 5 yields a resulting phase error signal (11, 28) which is processed by a PID controller 12 which has proportional, integral and differential components. The output from the PID controller 12 is the new control voltage (13, 29) to the motor 3, which can be obtained through the use of power control devices 33, such as TRIACs, SCRs, IGBTs or MOSFETS, to yield power control device outputs 14 of RMS motor voltage 13 supplied with line voltages 50 for each phase for maximum energy savings.

In this closed loop system, the voltage 13 of each phase of the motor 3 and the current are continually monitored. The motor controller 4 will drive the observed phase angle 5 to the point on the calibrated control line 6 corresponding to the load that is on the motor. At this point, maximum energy savings will be realized because the control line 6 is based on known calibration data from the motor 3. The motor controller 4 can control the motor 3 just as if a technician set the voltage 13 by hand. The difference is that the DSP 1 can dynamically respond to changes in the load in real-time and make these adjustments on a cycle by cycle basis.

Figure 3:
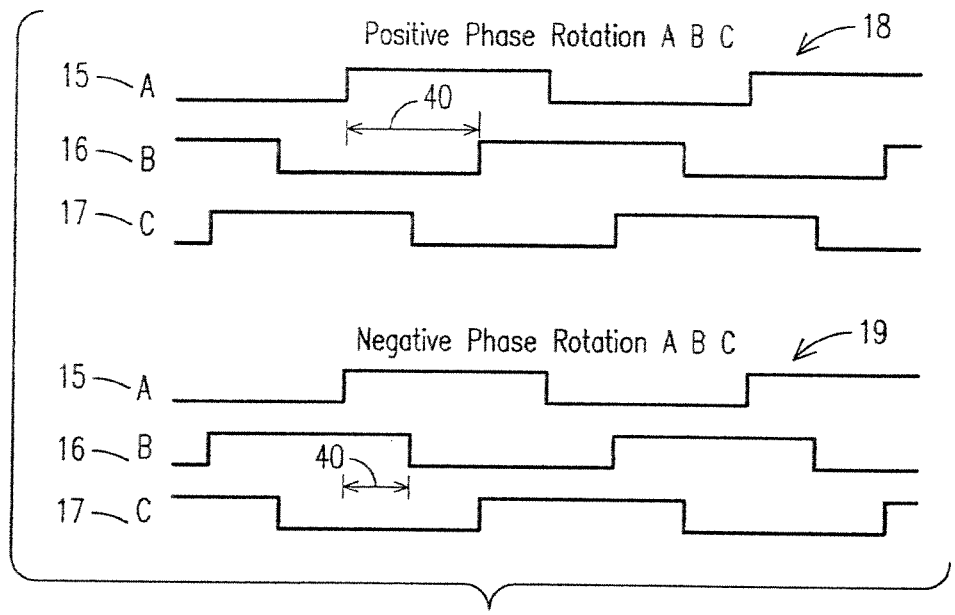
FIG. 3 is a diagram showing a phase rotation detection method.

Referring now to FIG. 3, in a three-phase system, the motor controller 4 is used to automatically determine the phase rotation. Zero-crossing detectors on the line voltages provide an accurate measurement of the angle between the phase A line voltage zero crossings 15 and the phase B line voltage zero crossings 16. For positive phase rotation 18, the angle is nominally 120° and for negative phase rotation 19, the angle is nominally 60°.

Figure 4:
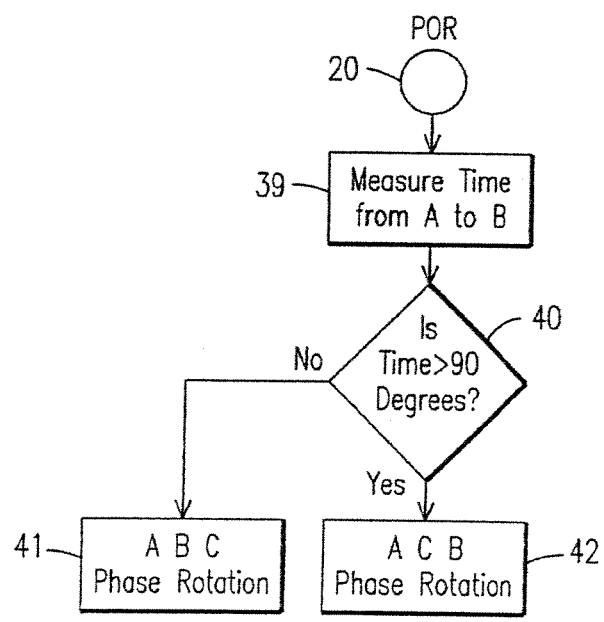
FIG. 4 is a flow chart showing a phase rotation detection method.

Referring to FIG. 4, a flow chart for phase rotation detection is shown. After a power-on-reset (POR) 20, it is easy for the motor controller 4 to determine positive phase rotation 18 and the negative phase rotation 19. First, the time is measured from phase A line voltage zero crossings to phase B line voltage zero crossings 39. Next it is determined if the time is greater than or less than 90 degrees 40. If it greater than 90 degrees, than it is an ACB rotation 42. If the time is less than 90 degrees, than it is an ABC rotation 41. The motor controller 4 can control three-phase or single-phase motors with the same basic software and hardware architecture. For the three-phase case, depending on the phase rotation, the motor controller 4 can drive power control device outputs 14.

Figure 5:
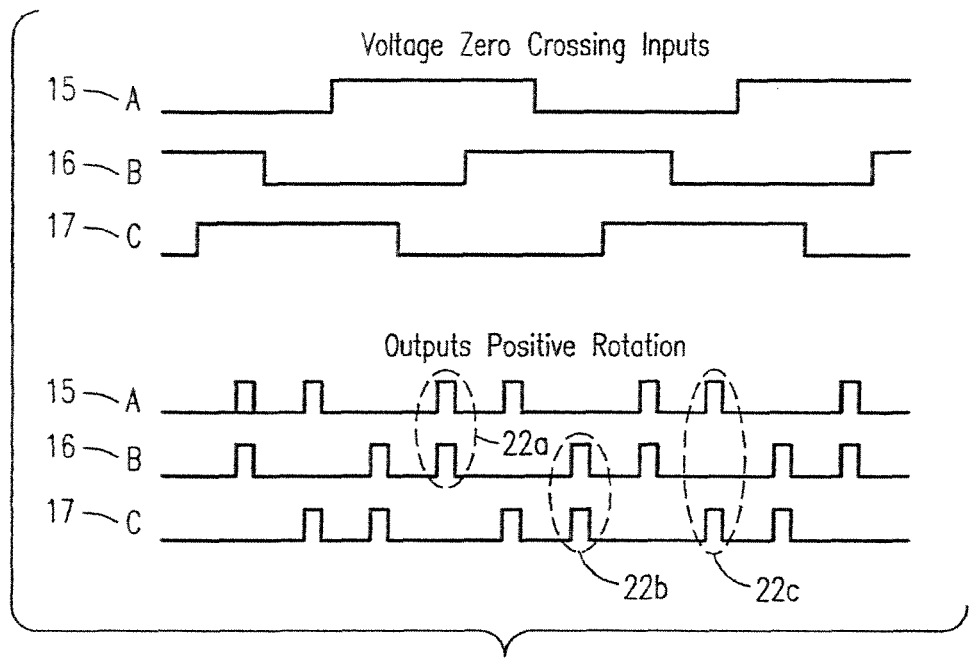
FIG. 5 is a graph showing power control device outputs for positive phase rotation.

Referring now to FIG. 5 which shows power control device outputs for positive drive rotation, the motor controller drives phase A power control device outputs 14 and phase B power control device outputs 14 together during the phase A line voltage zero crossings 15 turn-on time as indicated by the oval 22a. Similarly, the motor controller drives power control devices which drive phase B 16 and phase C power control device outputs 14 together during the phase B turn-on time as indicated by the oval 22b. Finally, the motor controller 4 drives phase C 17 and phase A power control device outputs 14 together during the phase C power control device outputs 14 turn-on time as indicated by the oval 22c. Note that the example shown in FIGS. 5 and 6 depicts a firing angle/duty cycle 23 of 90°.

Figure 6:
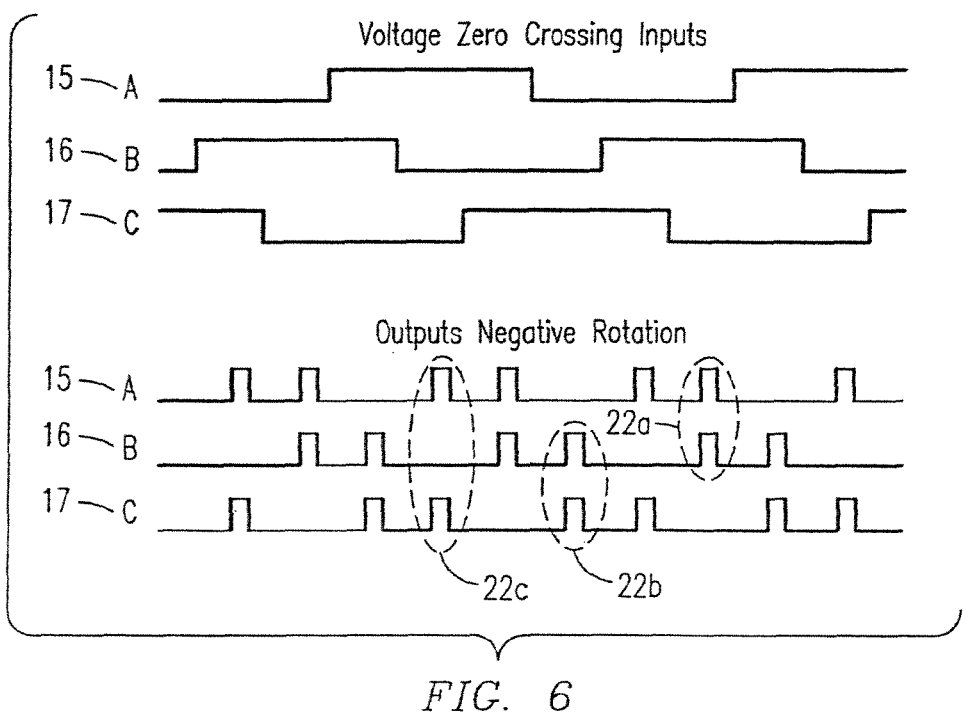
FIG. 6 is a graph showing power control device outputs for negative phase rotation.

Referring now to FIG. 6 which shows the TRIAC drive outputs for negative phase rotation, the motor controller 4 drives phase A power control device outputs 14 and phase C power control device outputs 14 together during the phase A line voltage zero crossings 15 turn-on time as indicated by the oval 22c. Similarly, the motor controller 4 drives phase B 16 and phase A power control device outputs 14 together during the phase B line voltage zero crossings 16 turn-on time, as indicated by oval 22a. Finally, the motor controller drives phase C power control device outputs 14 and phase B power control device outputs 14 together during the phase C line voltage zero crossings 17 turn-on time, as indicated by oval 22*b*.

Figure 7:
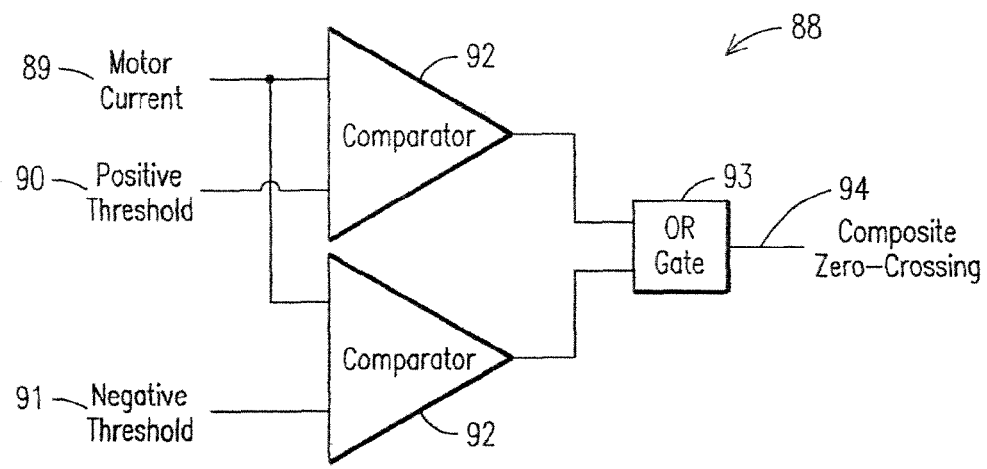
FIG. 7 is a block diagram of a window comparator.

Now referring to FIG. 7, a block diagram of a window comparator is shown. The DSP based motor controller uses the window comparator 88 to detect zero-crossings of both positive and negative halves of a current wave form. When RMS motor voltage is reduced by the motor controller, it is difficult to detect zero crossings of current waveform because the current is zero for a significant portion of both half cycles. First, motor current is provided 89, a positive voltage is provided 90 as a reference for a positive half cycle and a negative voltage is provided 91 as a reference. Next, the current, positive voltage and negative voltage are presented to two comparators 92 and are then passed through an operation (OR) gate 93 to create a composite zero-cross digital signal 94.

Figure 8:
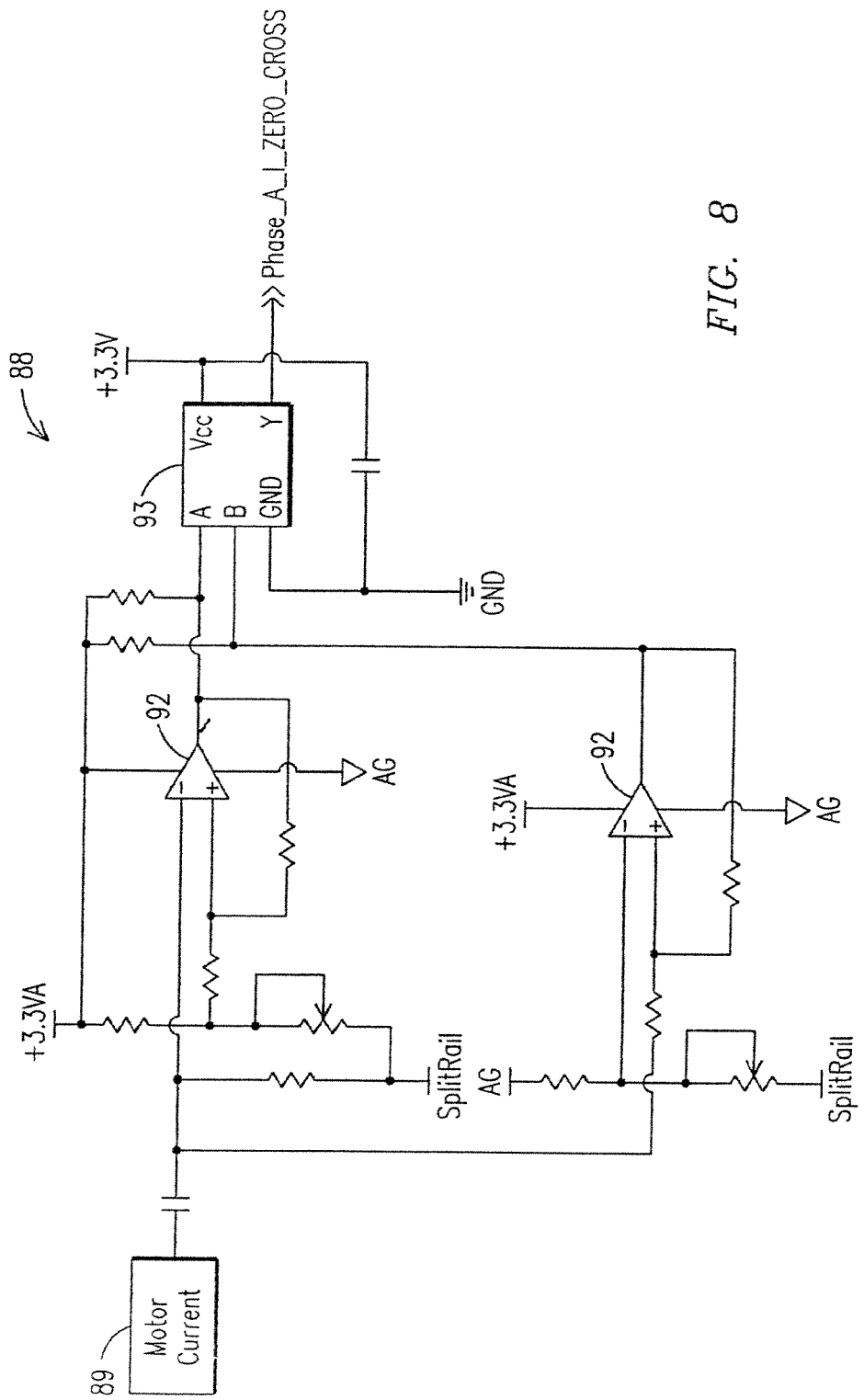
FIG. 8 is a schematic of the window comparator.

As further illustrated in FIG. 8, a schematic of the window comparator 88 is shown. The motor current is provided 89, a positive voltage is provided 90 as a reference for a positive half cycle and a negative voltage is provided 91 as a reference. Next, the current, represented as a positive voltage and negative voltage, is processed by two comparators 92 and are then passed to an OR gate 93 to create a composite zero-cross digital signal 94.

Figure 9:
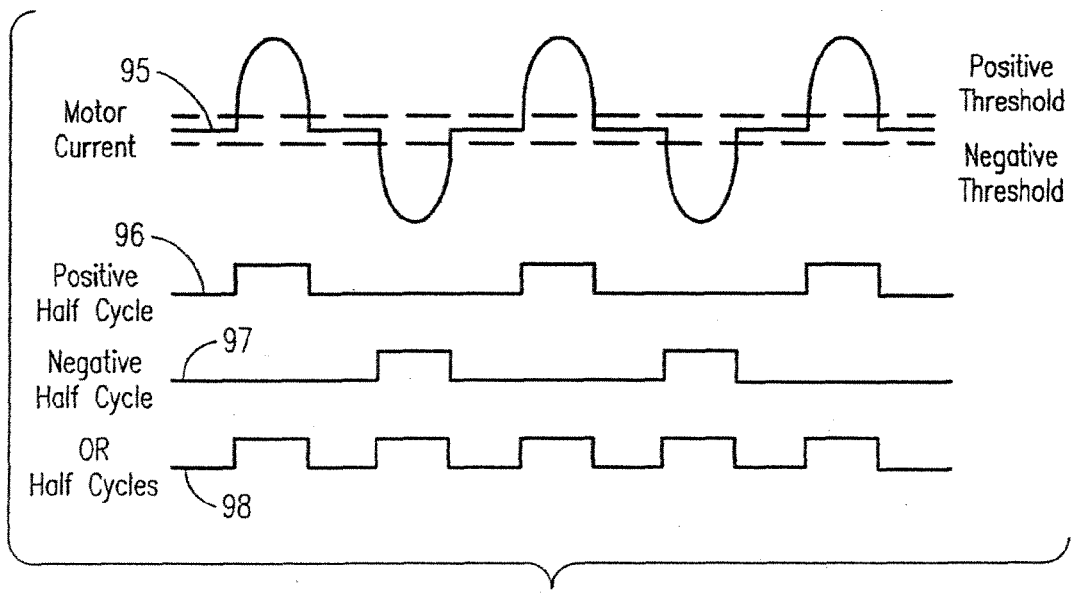
FIG. 9 is a graph of a current waveform and zero-cross signals.

Further, FIG. 9 shows graphs of a current waveform 95, a positive voltage half cycle 96, a negative voltage half cycle 97 and an OR function 98.

Figure 10:
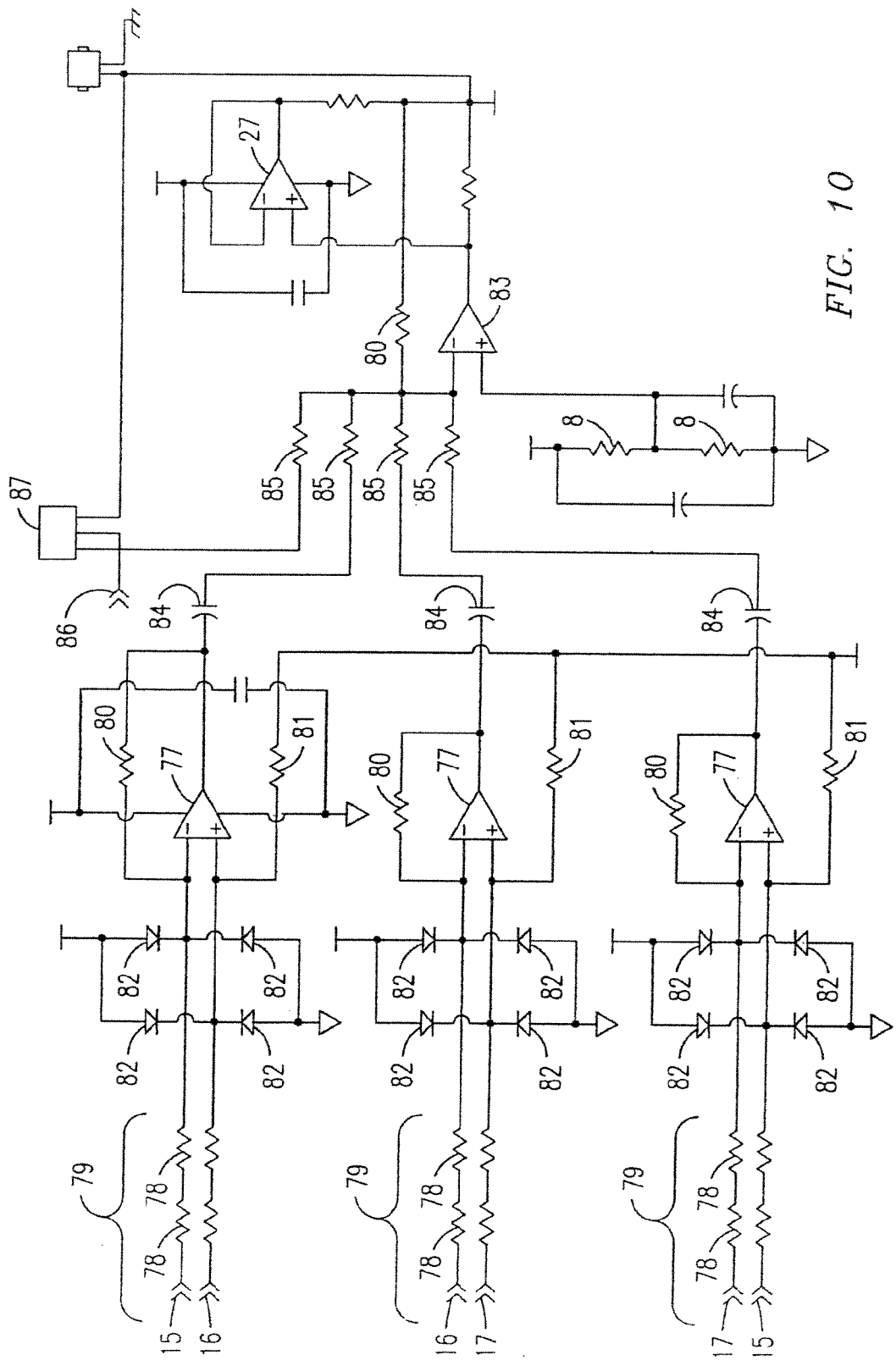
FIG. 10 is a schematic of a virtual neutral circuit.

Now referring to FIG. 10, a schematic of a virtual neutral circuit is shown. A virtual neutral circuit may be used as a reference in situations where three phase power is available only in delta mode and there is no neutral present for use as a reference. The virtual neutral circuit comprises three differential-to-single-ended amplifiers 77. Because phase to phase voltages are high, input resistors 78 are used to form a suitable attenuator 79 together with feedback resistors 80 and ground reference resistors 81. Because the danger exists of a loss of phase, protection diodes 82 are used to protect the differential-to-single-ended amplifiers 77. The differential-to-single-ended amplifiers 77 are coupled to a summing amplifier 83 through DC blocking capacitors 84 and summing resistors 85 together with the feedback resistor 80. The output of the summing amplifier 83 is boosted by amplifier 27 thereby providing a low impedance output which is at neutral potential. Additional resistors divide a supply rail thereby allowing the summing amplifier 83 to handle alternating positive and negative signals. An alternate connection is available in the event that a neutral 86 is available along with a jumper block for alternate neutral connection 87.

Figure 11:
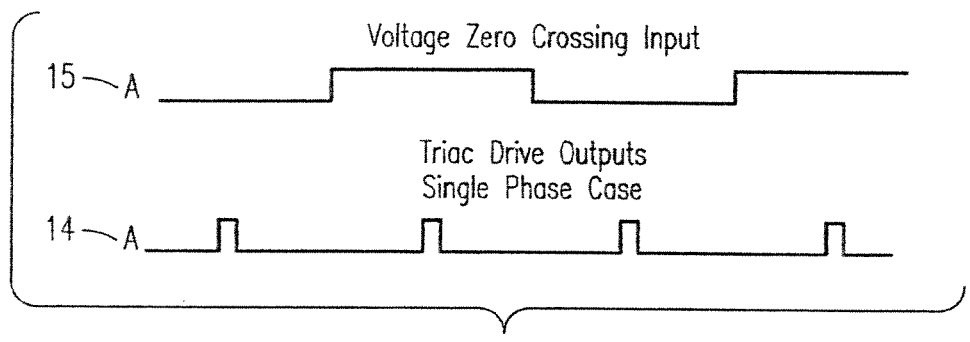
FIG. 11 is a graph showing power control device outputs for single phase applications.

Referring now to FIG. 11 showing a power control device output 14 for a single-phase application, the output 14 for phase A is turned on each half-cycle based on a power control device output 14 derived from the voltage zero-crossing input 15. The power control device output 14 for phase B line voltage zero crossings and phase C line voltage zero crossings are disabled in the DSP 1 and the hardware may not be present. The power control device outputs 14 are not paired as they were in the three-phase case.

Figure 12:
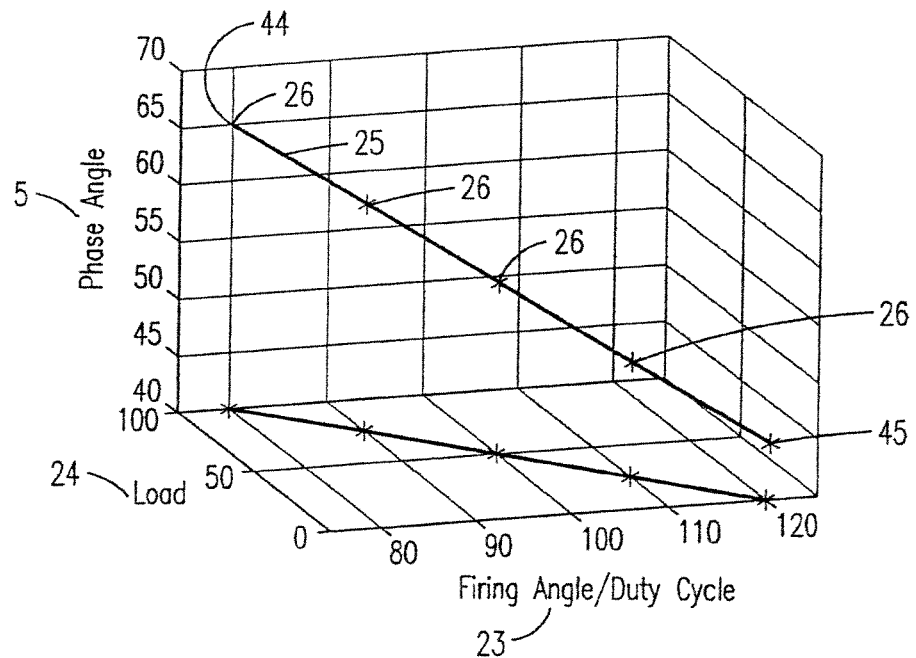
FIG. 12 is a three-dimensional graph showing a three-dimensional control line.

Referring now to FIG. 12 which illustrates a three-dimensional control line for the motor operating space of a motor bounded by an observed phase angle 5 on the y-axis. A controlled firing angle/duty cycle 23 showing the decrease in voltage is shown on the x-axis and the percent load 24 on a motor is shown on the z-axis.

Every motor operates along a parametrical control line 25 within its operating space. For example, when a given motor is 50% loaded and the firing angle/duty cycle 23 is set to 100°, a phase angle 5 of approximately 55° is observed.

The parametrical control line 25 shown in FIG. 12 is defined by five parametric operating points 26 ranging from a loaded case 44 in the upper left corner, to an unloaded case 45 in the lower right corner. Furthermore, the parametrical control line 25 has special meaning because it is the line where a motor is using the least energy possible. If the firing angle/duty cycle 23 is increased and the motor voltage 13 decreased then a motor would slow down and possibly stall. Similar results would be seen if the load on the motor 3 is increased.

Figure 13:
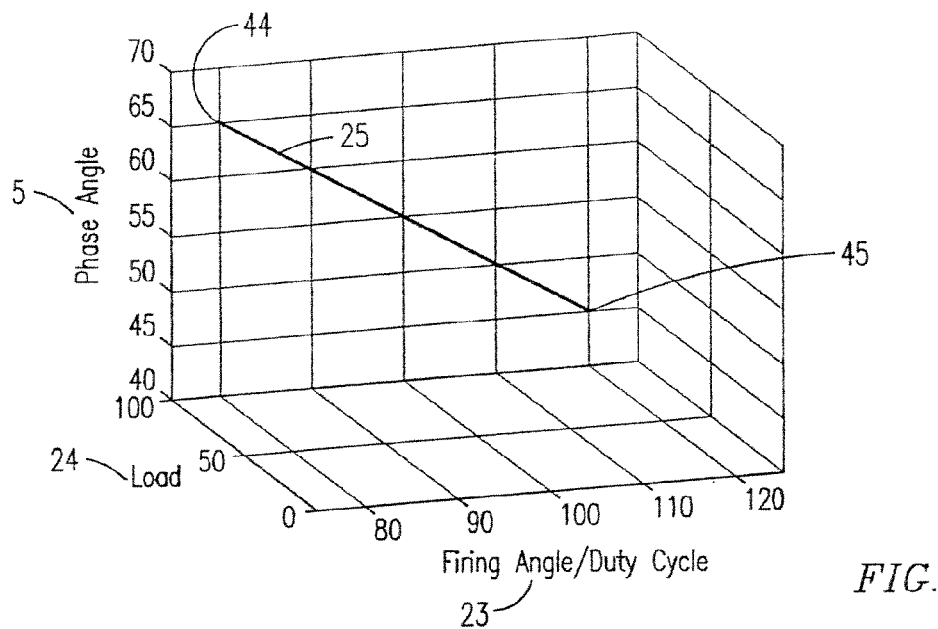
FIG. 13 is a three-dimensional graph showing a control line projected onto one plane.

As illustrated in FIG. 13, the parametric control line 25 may be parameterized and projected onto one plane described by phase angle 5 in the vertical direction and the firing angle/duty cycle 23 in the horizontal direction.

Figure 14:
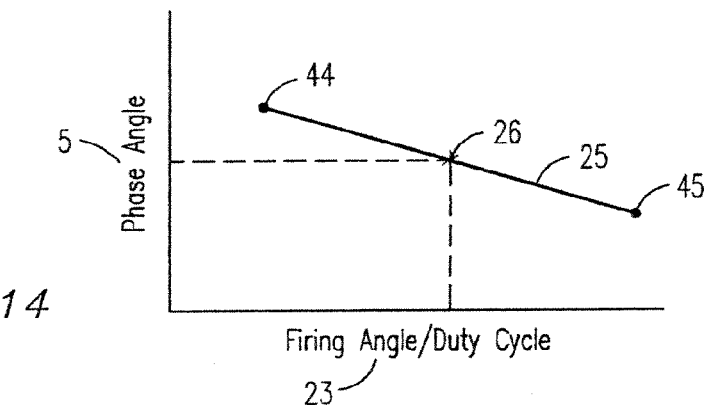
FIG. 14 is a graph showing a two-dimensional plotted control line.

Further, as shown in FIG. 14, the parametrical control line 25 may be displayed on a two-dimensional graph. On the x-axis, increasing firing angle/duty cycle 23 may be equated with a decreasing motor voltage. This is because small firing angle/duty cycles result in high voltage and large firing angle/duty cycles result in low voltage. The motor controller will drive the observed phase angle 5 to the point on the control line 25 that corresponds to the load presently on a motor. To accomplish this, a DSP computes the phase angle 5 between the voltage and current.

Referring back to the block diagram of FIG. 2, the DSP 1 then computes the next target phase angle 5 based on the present value of the RMS voltage 13, or equivalently the present value of the firing angle/duty cycle. The difference between the observed phase angle and the target phase angle 10 results in a phase angle error, which is processed through a PID controller 12 or similar device to generate a new control target. This control target changes the voltage in such a way as to minimize the phase angle error. The target phase angle 10 is dynamic and it changes as a function of the firing angle/duty cycle.

As stated above, the motor controller 4 will drive the observed phase angle 5 to the point on the control line 25 that corresponds to the load presently on the motor 3. This operating point 26 provides the maximum energy savings possible because the control line 25 is calibrated directly from the motor 3 that is being controlled.

Figure 15:
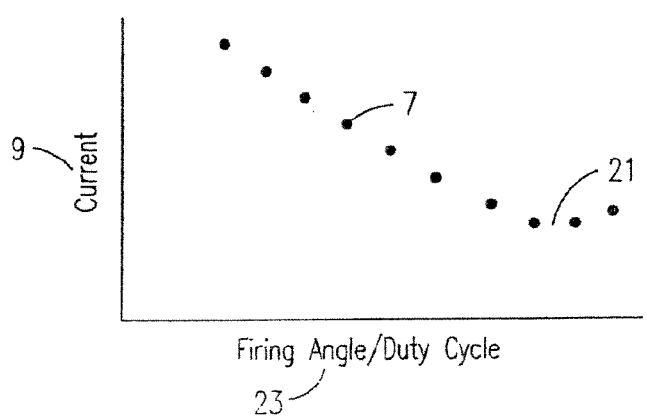
FIG. 15 is a graph showing a sweeping firing angle/duty cycle in a semi-automatic calibration.

This method for calibration is called semi-automatic calibration. The semi-automatic calibration is based on the DSP 1 sweeping the control space of the motor. As shown in FIG. 15, sweeping the control space means that the DSP increases the firing angle/duty cycle 23 and records the current 9 and firing angle/duty cycle 23 of each phase at discrete points along the way. Thus, in this manner it is possible to see the beginning of the stall point 21 of the motor. A well-defined linear portion of observed calibration data curve obtained from sweeping the control space 7, which is used to determine points on the control line 6, has a constant negative slope at lower firing angle/duty cycles 23. Then, as the firing angle/duty cycle 23 continues to increase, the current 9 begins to flatten out and actually begins to increase as the motor 3 begins to slip and starts to stall, called the "knee" 31.

Figure 16:
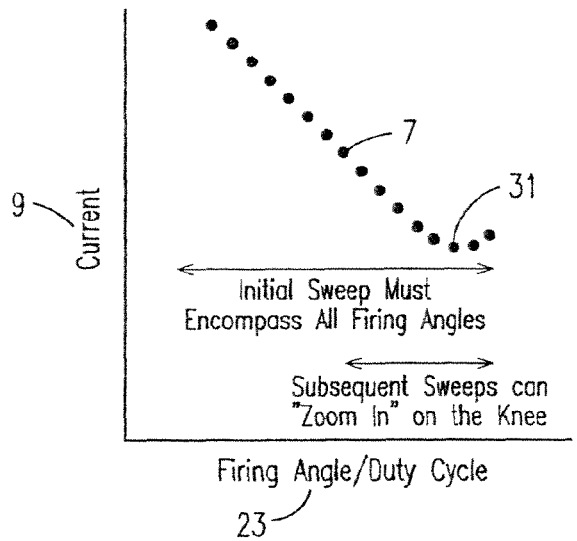
FIG. 16 is a graph showing a directed sweep of a firing angle/duty cycle.

As shown in FIG. 16, subsequent sweeps can be directed at smaller ranges of motor voltages to "zoom in" on the knee. The motor controller 4 requires multiple sweeps in order to get data that is statistically accurate. There is a tradeoff between the number of sweeps and the time required to calibrate the control line 25. A measure of the quality of the calibration can be maintained by the DSP 1 using well known statistical processes and additional sweeps can be made if necessary. This is true because the DSP 1 has learned the approximate location of knee 31 from the first sweep.

There is little danger of stalling during the semi-automatic sweep because of the controlled environment of the setup. A technician or operator helps to insure that no sudden loads are applied to the motor 3 under test while a semi-automatic calibration is in progress.

The process of sweeping the control space can be performed at any fixed load. For example, it can be performed once with the motor 3 fully loaded and once with the motor 3 unloaded. These two points become the two points that define the control line 25. It is not necessary to perform the calibration at exactly these two points. The DSP 1 will extend the control line 25 beyond both these two points if required.

Figure 17:
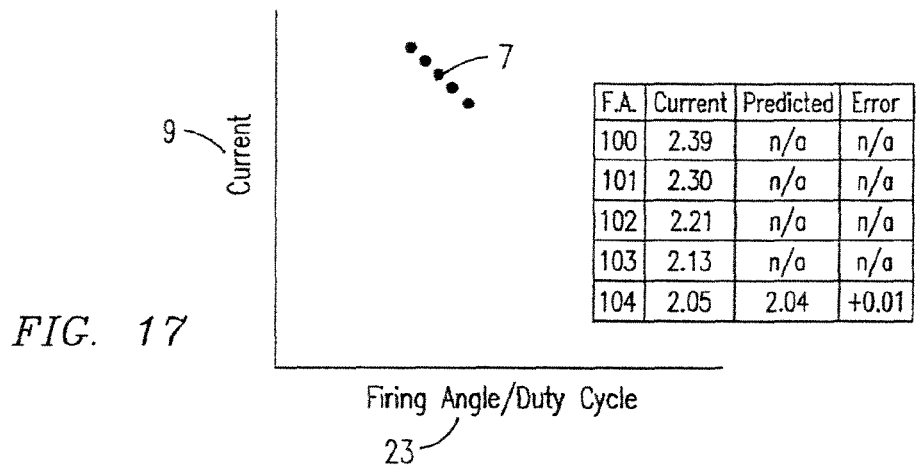
FIG. 17 is a graph showing plotted semi-automatic calibration data.

There are many numerical methods that can be applied to find the stall point 21 in the plot of the current motor voltage 23. As shown in FIG. 17, a method is to use the "least squares" method to calculate a straight line that best fits the accumulated data tabulated from the first five motor voltages 23.

Figure 18:
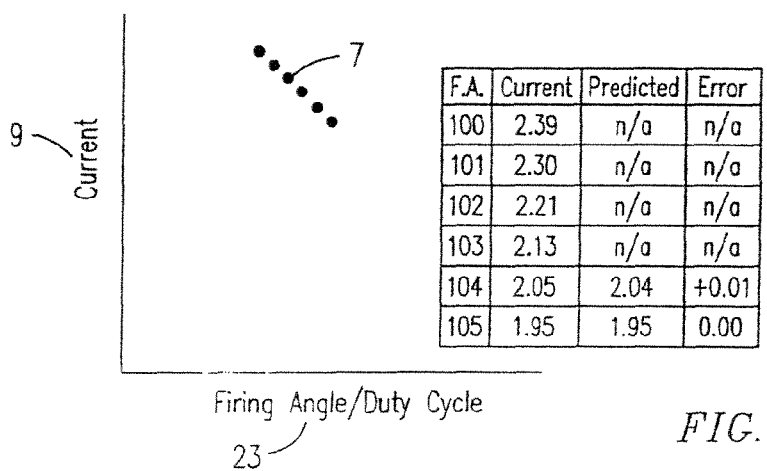
FIG. 18 is a graph showing plotted semi-automatic calibration data.

The continuation of this method is shown in FIG. 18. Using the previous data points the value of the current 9 may be predicted. Graphically, the DSP 1 is checking for one or more points that deviate in the positive direction from the predicted straight line.

Figure 19:
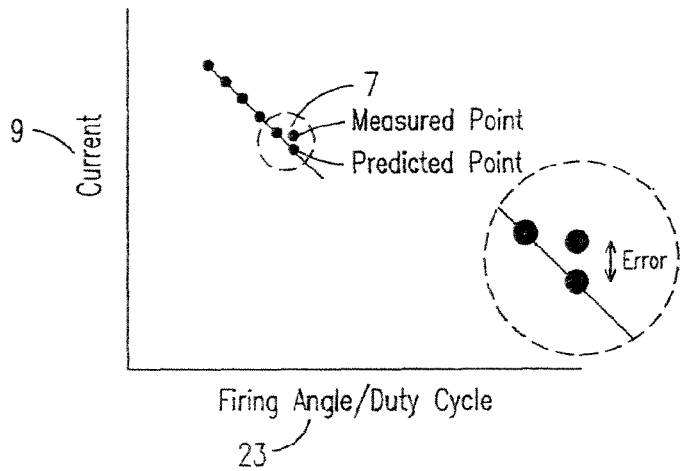
FIG. 19 is a graph showing plotted semi-automatic calibration data.

As shown in FIG. 19, the DSP 1 is looking for the beginning of the knee in the curve. The first point that deviates from the predicted control line may or may not be the beginning of the knee 31. The first point with a positive error may simply be a noisy data point. The only way to verify that the observed calibration data curve obtained from sweeping the control space 7 is turning is to observe data obtained from additional sweeps.

Figure 20:
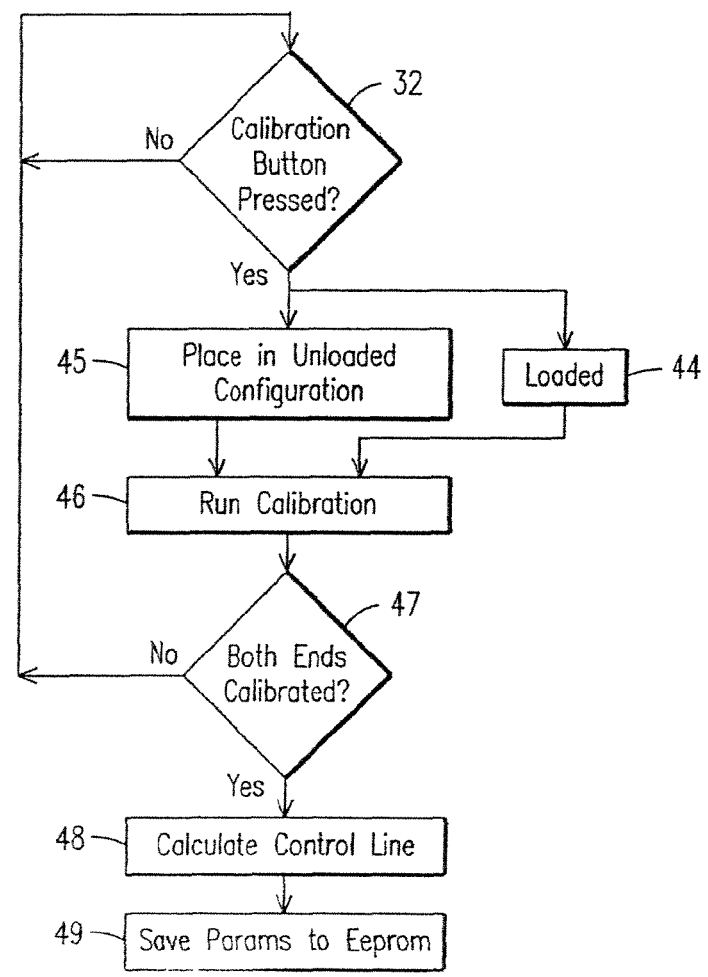
FIG. 20 is a flow chart of a semi-automatic high level calibration.

Semi-automatic calibration may be performed in the field. Referring now to FIG. 20, a flow chart showing how semi-automatic calibration is performed is shown. First the motor 3 is placed in a heavily loaded configuration 44. Ideally this configuration is greater than 50% of the fully rated load. Next a calibration button 32 on the motor controller 4 is pressed to tell the DSP 1 to perform a fully-loaded measurement. The DSP 1 runs a calibration 46 which requires several seconds to explore the operating space of the motor 3 to determine the fully-loaded point. The motor controller 4 indicates that it has finished this step by turning on an LED.

Next the motor 3 is placed in an unloaded configuration 45. Ideally this configuration is less than 25% of the rated load. Then a calibration button 32 on the motor controller 4 is pressed 47 to tell the DSP 1 to perform an unloaded measurement. The DSP 1 runs the calibration 46 to determine the unloaded point. The motor controller 4 indicates that it has finished calibrating both ends 47 of the control line 25 by turning on a light emitting diode (LED). The DSP 1 then determines the control line 48 using the two measurements and applies this control line when it is managing the motor 3. The values of the control line 25 are stored in non-volatile memory 49.

Figure 21:
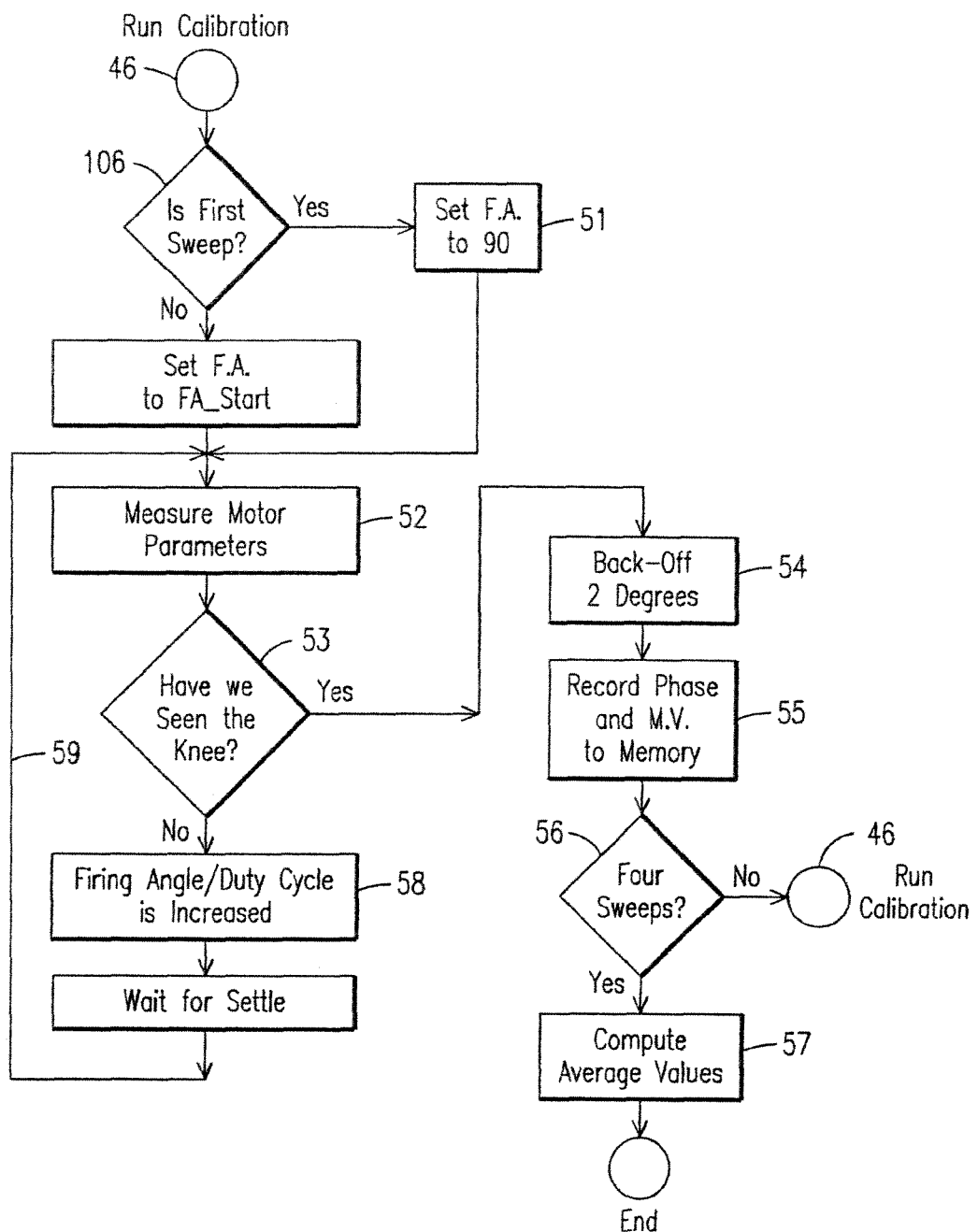
FIG. 21 is a flow chart of a semi-automatic high level calibration.

FIG. 21 shows a more detailed flow chart of the semi-automatic calibration. First a first calibration sweep is run 46 with the motor voltage set at a certain degree 51, depending on if it is a first sweep or previous sweeps have been run 106, in which the motor controller measures the motor 52 until the motor controller detects a knee 53. If a knee 53 is detected the firing angle/duty cycle is decreased by two degrees 54 and the phase angle and the motor voltage are recorded to the memory 55. This process is repeated to obtain at least four sweeps 56 to get a computed average value 57 of the phase angle and the firing angle/duty cycle. If during any step along the calibration sweep, the knee is not detected, then the firing angle/duty cycle is increased by at least one degree 58 and the nest step is measured 59.

Figure 22:
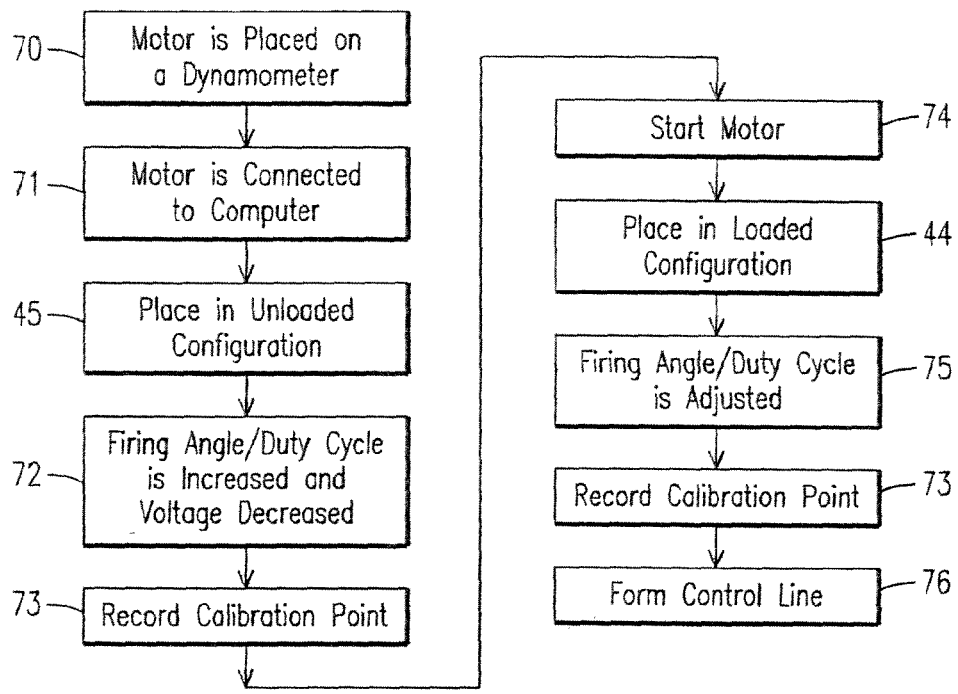
FIG. 22 is a flow chart of a manual calibration.

An alternative method for calibration is called manual calibration. FIG. 22 shows a flow chart of manual calibration. First a motor is placed on a dynamometer 70. Next the motor is connected to a computer for manual control 71 which allows the motor to be run in a open-loop mode and the firing angle/duty cycle of the AC induction motor to be manually set to any operating point. Then the motor is placed in a fully unloaded configuration 45. Next the firing angle/duty cycle is increased and the RMS motor voltage is reduced 72 until the motor is just about to stall. The firing angle/duty cycle and phase angle are recorded and this becomes a calibrated point which is recorded 73. Then the motor is started with drive elements fully on 74. Then the motor is placed in a fully loaded configuration 44. Next the firing angle/duty cycle is increased or decreased until the RMS motor voltage is chopped by the motor controller 75 until the motor is just about to stall. The firing angle/duty cycle are recorded and this becomes another calibrated point which is recorded 73. Finally the two calibrated points are used to form a control line 76.

When the RMS line voltage is greater than a programmed fixed-voltage, the DSP controller clamps the RMS motor voltage at that fixed voltage so energy savings are possible even at full load. For example, if the mains voltage is above the motor nameplate voltage of 115V in the case of a single phase motor then the motor voltage is clamped at 115V. This operation of clamping the motor voltage, allows the motor controller to save energy even when the motor is fully loaded in single-phase or three-phase applications.

Figure 23:
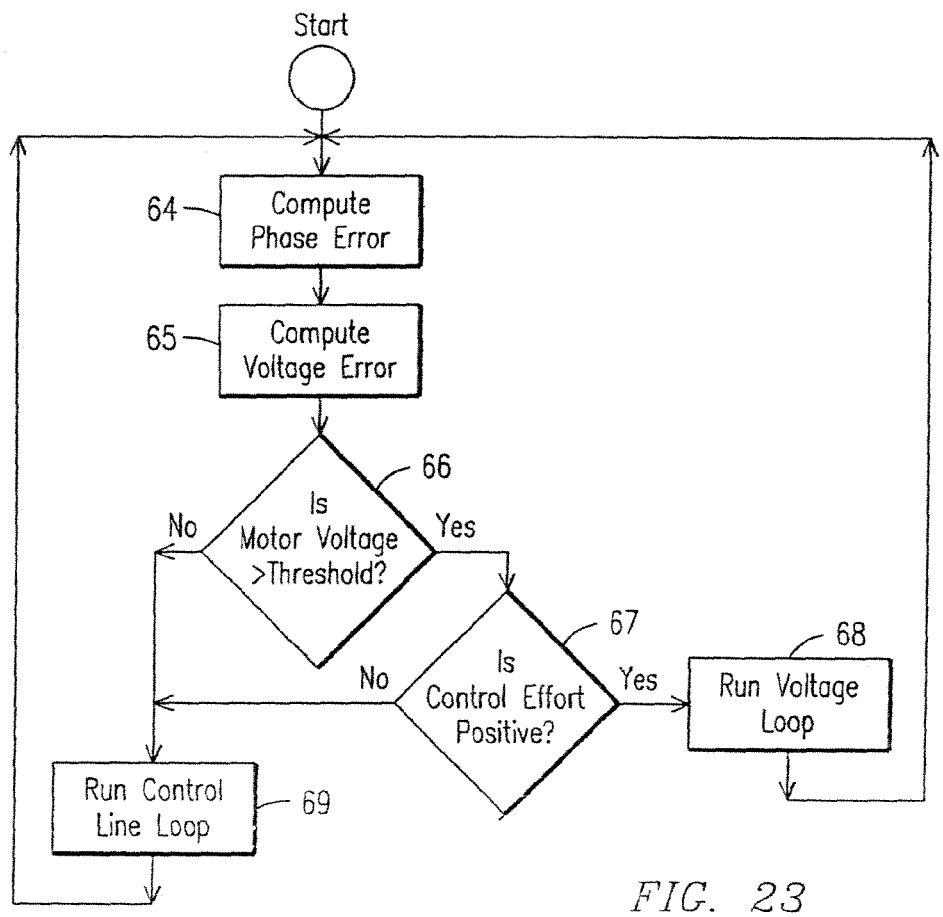
FIG. 23 is a flow chart of a fixed voltage clamp.

FIG. 23 shows a flow chart of the fixed voltage clamp. First a phase error is computed 64. Next a voltage error is computed 65. Then the RMS motor voltage of the AC induction motor is determined and compared to a fixed voltage threshold 66. If the RMS motor voltage is greater than the fixed voltage threshold then it is determined whether or not control target is positive 67. If the control target is positive then a voltage control loop is run 68. If the RMS motor voltage of the AC induction motor is less than a fixed-voltage threshold, then the a control line closed loop is run 69 and the entire process is repeated. If the control target is determined not to be positive then a control line loop is run 69 and the entire process is repeated again.

In some cases, it may not be possible to fully load the motor 3 during the calibration process. Perhaps 50% is the greatest load that can be achieved while the motor is installed in the field. Conversely, it may not be possible to fully unload the motor; it may be that only 40% is the lightest load that can be achieved.

Figure 24:
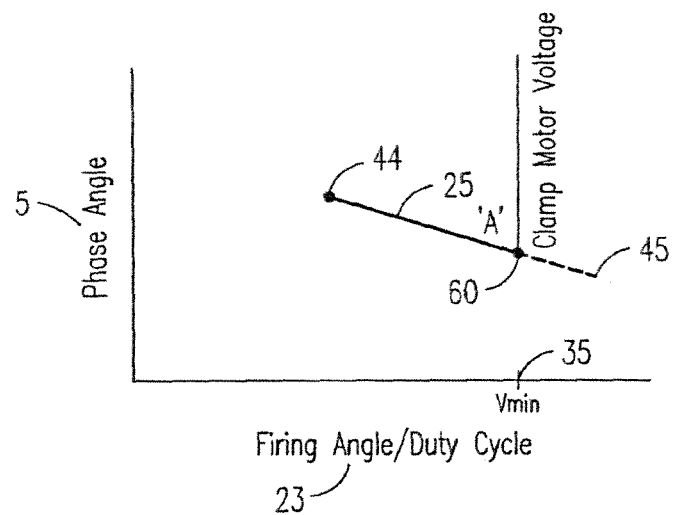
FIG. 24 is a graph showing a RMS motor voltage clamp.

FIG. 24 shows an example of both load points being near the middle of the operating range. On the unloaded end 45 at the right of the control line 25, the DSP 1 will set the fixed voltage clamp 60 of the voltage at minimum voltage 35. When the load on the motor increases, the DSP 1 will follow the control line moving to the left and up the control segment 61. This implementation is a conservative approach and protects the motor 3 from running in un-calibrated space.

Figure 25:
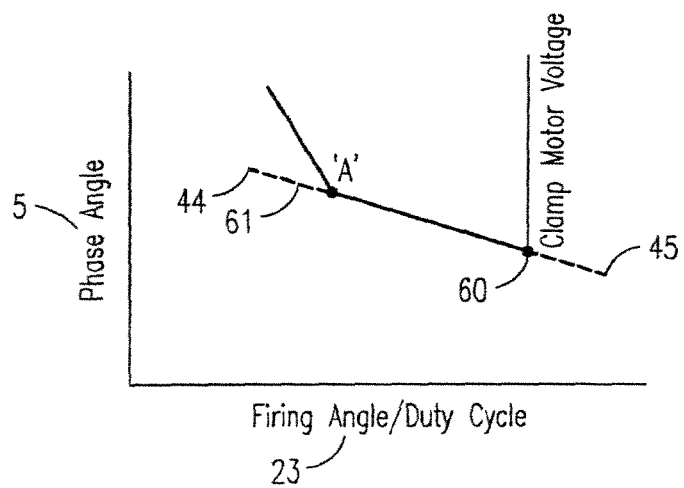
FIG. 25 is a graph showing a RMS motor voltage clamp.

As further shown in FIG. 25, on the fully loaded end 44 at the left, the DSP 1 will synthesize a control segment 61 with a large negative slope. This implementation is a conservative approach and drives the voltage to full-on.

Figure 26:
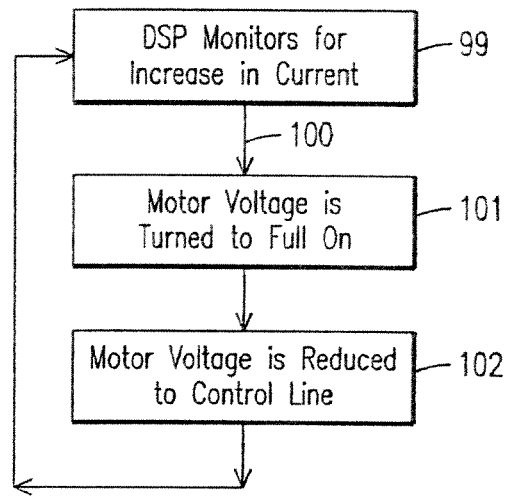
FIG. 26 is a flow chart of a stall mitigation technique.

Referring now to FIG. 26, the DSP-based motor controller uses a special technique to protect a motor from stalling. First, the DSP actively monitors for a significant increase in current 99 which indicates that load on the motor has increased. Next, if a significant increase is observed 100 then the DSP turns motor voltage to full on 101. Next, the DSP will attempt to reduce motor voltage to return to the control 102 and the DSP returns to actively monitoring for a significant increase in current 99. This technique is a conservative and safe alternative to the DSP attempting to track power requirements that are unknown at that time.

Figure 27:
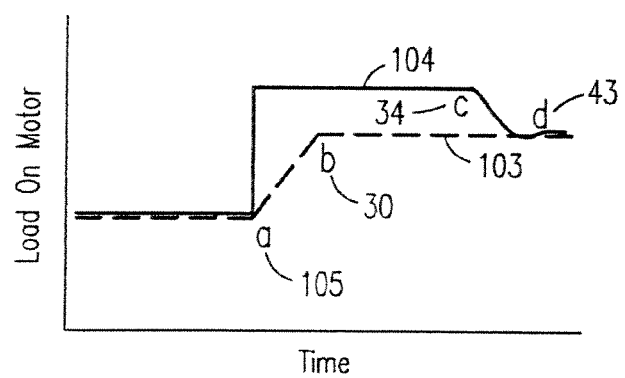
FIG. 27 is a graph showing the stall mitigation technique.

As further shown in FIG. 27, a graph of the stall mitigation technique, the load on the motor is represented on an x-axis and time is represented on a y-axis. The bottom line represents the load on the motor 103 and the top line represents the power applied to the motor by the DSP 104. Prior to point a 105, the DSP is dynamically controlling the motor at a fixed load. In between point a 105 and point b 30, the load on the motor is suddenly increased and the DSP turns the motor voltage to full on. At point c 34, the DSP reduces the motor voltage to point d 43.

Figure 28:
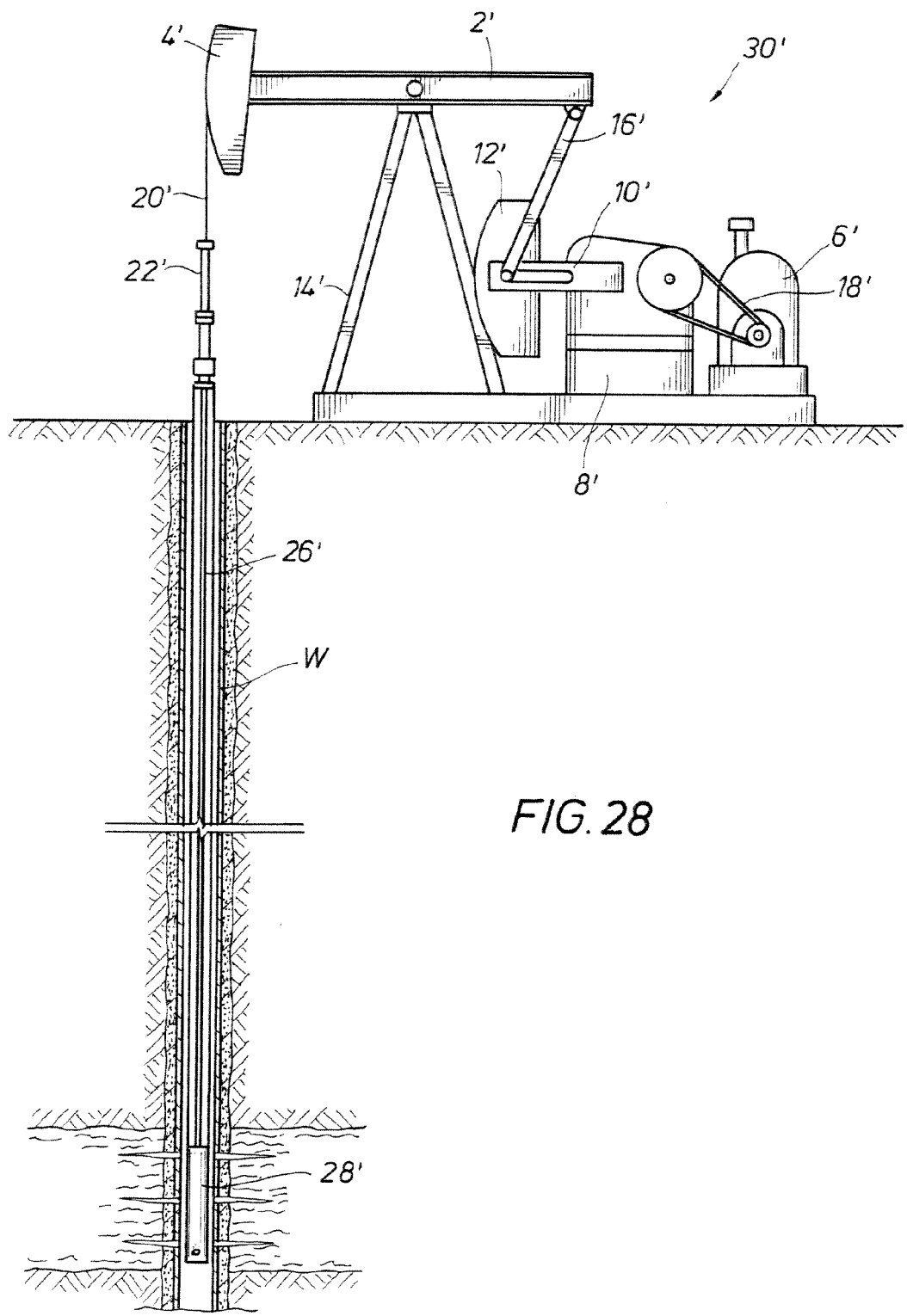
FIG. 28 is an elevational view of one embodiment of a pump jack positioned with a tubular string in a well.

In FIG. 28, a pump jack 30' is positioned on the ground adjacent well W. Prime mover or motor 6' drives gear system or transmission 8' with drive belt 18'. Motor 6' may be connected with a electric utility grid for the supply of power. One end of counterweight arm or crank arm 10' is disposed with gear system 8', and the other end of counterweight arm 10' is disposed with counterweight or rotating mass 12'. There are preferably two counterweight arms 10', with counterweight 12' disposed between them. Lever or walking beam 2' pivots on sampson post or A-frame 14'. One end of pitman arm or beam arm 16' is rotationally attached with one end of beam 2', and the other end of beam arm 16' is rotationally attached with rotating mass 12' and an end of counterweight arm 10'. Beam protrusion or head 4' is disposed on the end of beam 2' adjacent to well W. As can now be understood, pump jack 30' has a conventional design.

One end of cable 20' is attached with beam head 4', and the other end of cable 20' is attached with polished rod or rod 22'. Rod 22' is disposed with the substantially vertical tubular string or sucker rods 26' extending in the well W through the production tubing to the downhole pump 28'. Tubular string may comprise sucker rods, pipe, tubulars, or other components used with a pump jack or other similar device to assist in pumping or lifting fluids from a well. The motor 6' may drive the pump jack 30' by rotating an end of the counterweight arm 10' about a horizontal axis. As the counterweight 12' moves upward, beam 2' pivots about a horizontal axis on A-frame 14' and moves the beam head 4' downward. As the counterweight 12' moves past its uppermost position, it free-falls downward due to gravity and its momentum, and beam 2' pivots about A-frame 14' and moves beam head 4' upward. The pushing and pulling of the string of tubulars 26' by the beam head 4' operates the piston in the downhole pump 28'. The tubular string 26' moves and reciprocates substantially vertically in the well W.

The motor 6' is normally in energy consumption mode. However, the motor 6' may be in the energy generation mode when the falling masses (either the counterweight 12' or the rod or tubular string 26') are free-falling, thereby accelerating the motor 6' beyond its synchronous speed, where the speed is limited by the generated current. Although an exemplary conventional pump jack 30' is shown in FIG. 28, it is contemplated that all pump jack designs, including, but not limited to, different conventional designs, the Lufkin Mark II design, beam-balanced design, and conventional portable design may be used with the embodiments of the invention. Although the embodiments are shown with pump jacks, it is also contemplated that all of the embodiments may be used with any device having a rotating or reciprocating mass.

Figure 29:
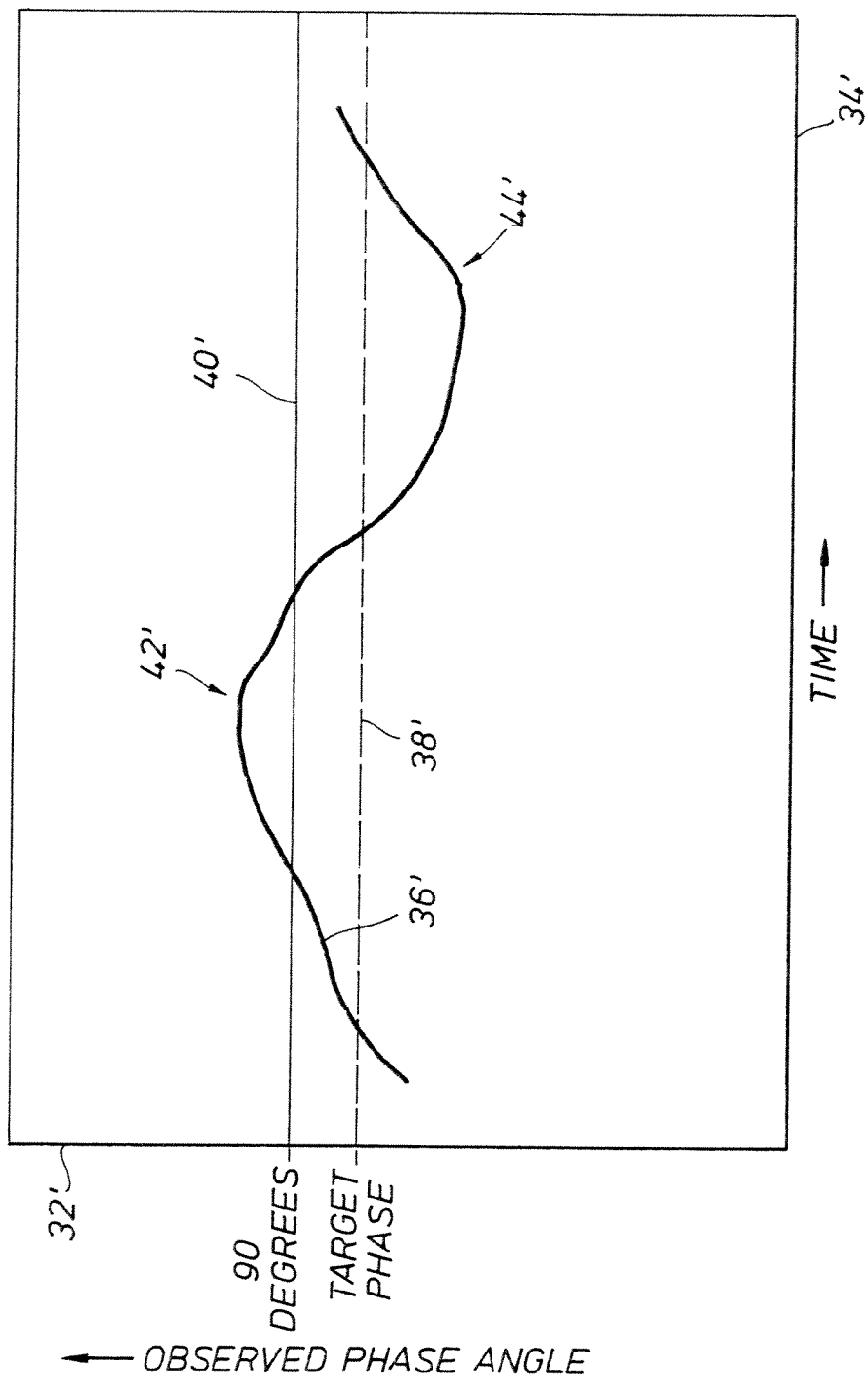
FIG. 29 is a plot of observed phase angle versus time for a pump jack motor in an open loop mode.

Turning to FIG. 29, plot 36' with observed phase angle on the vertical axis 32' and time on the horizontal axis 34' is shown for an electric motor attached to a pump jack, such as motor 6' and pump jack 30' in FIG. 28, in open loop mode. The embodiments of the invention described below with FIGS. 30-32D have not been attached to the electric motor; therefore, the motor is in the open loop mode. Second horizontal line 40' is drawn at an observed phase angle of 90 degrees on the vertical axis 32'. When the plot 36' exceeds an observed phase angle of 90 degrees, which it does in plot first segment 42' above second horizontal line 40', then the motor is in the energy generation mode. At those times when the motor is generating, rather than consuming energy, the current lags the voltage by a phase angle in excess of 90 degrees. The greater the phase angle during generation, the greater the power being generated. The motor is in the heavy energy consumption mode in plot second segment 44' below first horizontal line 38'. First horizontal line 38' is drawn at a target phase angle less than 90 degrees on the vertical axis 32'. The target phase angle is discussed in detail below with FIGS. 30 and 31.

Figure 30:
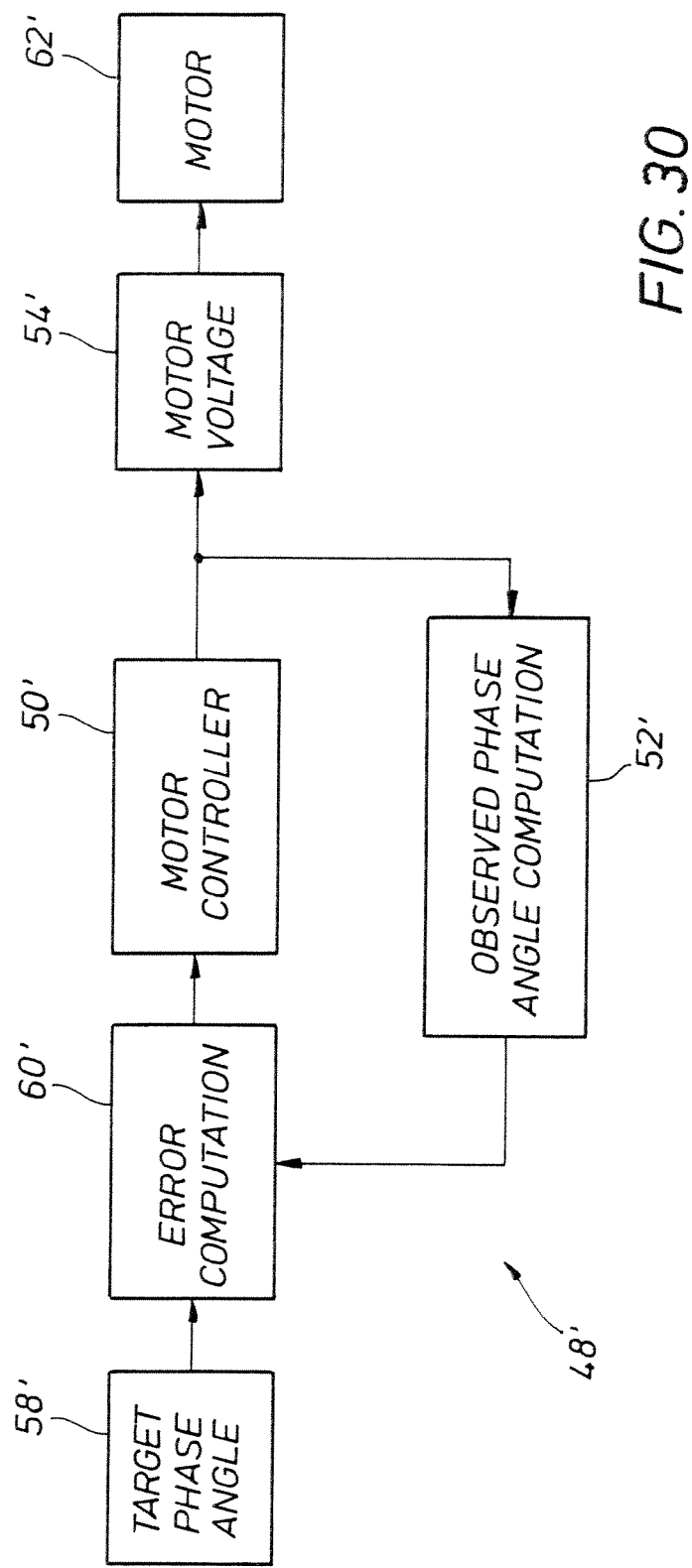
FIG. 30 is the system block diagram connected to the motor.

In FIG. 30, closed loop motor controller 50' is schematically shown connected to an electric motor 62', such as motor 6' in FIG. 28, which may be connected with a pump jack, such as pump jack 30' in FIG. 28. Other pump jack designs are also contemplated for use with FIG. 30. Motor controller 50' may be a PID controller. However, other closed loop motor controllers are also contemplated. A digital signal processor (DSP) based motor controller is contemplated, such as the DSP based motor controller in FIGS. 1 and 2, although other types of DSP based motor controllers are also contemplated. Closed loop motor controller 50' may be connected with motor (6', 62') in the same manner as shown in FIGS. 1 and 2. A microprocessor based controller is also contemplated. In one embodiment, the closed loop controller system may have a PID controller as a component. In the closed loop control system or servo system 48', controller 50' may compute 52' the observed phase angles from the voltage and current supplied to the motor 62'.

Advantageously, no sensors need to be positioned with the motor (6', 62'), the pump jack 30' or the downhole pump 28'. Further, the closed loop system 48' may be adaptive to each individual downhole pump 28' and to changing parameters and requirements of the pump 28' and well W over time, including, but not limited to, changing volumes, densities, viscosities, weights, and other properties of materials and/or fluids pumped, such as gas, oil, water, and slurry. Voltage and current monitored by the system 48' serve as an indicator of the well condition, allowing the system to be adaptive to the changing well parameters. Monitoring the voltage and current on a substantially continuous basis allows for a substantially continuous reading of well conditions. The closed loop system 48' also adapts when the existing components of the pump jack system are replaced with other components having different characteristics, such as for example replacing the tubular string with a different tubular string having a different weight, or replacing the counterweight with a different sized counterweight, provided that the mechanical system is rebalanced after the components are substituted. After rebalancing of the mechanical system, the embodiments of the invention allow the energy savings to resume.

A target phase angle 58' input into the controller 50' may be compared with the computed observed phase angle 52', and the error 60' or difference between the two values determined by the controller 50'. It is contemplated that the target phase angle 58' may be substantially 90 degrees, or the target phase angle 58' may be greater or less than 90 degrees. At the time of installation, a target phase angle 58' may be selected that produces optimum results for the motor in use. The target phase angle 58' may be constant for all motor loads, such as 65 degrees, although other constant target phase angles 58' are also contemplated. The target phase angle 58' may also be a variable function of the motor load at any instant. The setting for the target phase angle 58' may be the lowest possible target phase angle that maintains a sufficiently observable current flow at all times while still supplying sufficient power to meet the motor's requirements at all loads.

The motor controller 50' may control the supply voltage 54' applied to motor 62' based upon the error signal 60'. When the error 60' is significant because the observed phase angle is too large, such as during the period of open loop energy generation mode, controller 50' may reduce the supply voltage to the motor 62' to a lower value, such as to reduce the observed phase angle 52' to the target phase angle 58'. When the error 60' is significant because the observed phase angle 52' is too small, such as during the heavy energy consumption mode, controller 50' may increase the supply voltage 54' to the motor 62' to a higher value to move the observed phase angle 52' to the target phase angle 58'. In this closed loop system 48', the voltage and current may be continuously monitored and controlled by the motor controller 50'. It is also contemplated that the supply voltage 54' may be controlled through the use of power control devices, such as TRIACs, SCRs, IGBTs, or MOSFETs, as shown in FIG. 2. Also, controller 50' uses timers and pulse width modulation (PWM) techniques to control the supply voltage, which are discussed in detail below with FIGS. 32-32D. Other techniques are also contemplated.

Returning to FIG. 30, the controller 50' reads the voltages of each phase and current in the motor 62' to capture the zero-crossing points. FIGS. 5 and 6 of Pub. No. U.S. 2009/0046490 propose an oscillogram and circuitry diagram, respectively, of a volts zero crossing point determining means that is contemplated. Other types of volts zero crossing point determining means are also contemplated. Voltage and current may be converted from analog to digital using one or more analog to digital converters for monitoring and/or control purposes, as shown in FIG. 2. Controller 50' may perform computations 52' of motor phase angle to yield an observed phase angle. Controller 50' may compare the observed phase angle 52' with the target phase angle 58' and control the motor supply voltage 54' in response. The phase angle may be monitored in one or more phases. Controller 50' may be used to automatically determine the phase rotation. A circuit diagram of a phase support means and phase rotation determination means that is contemplated is proposed in FIG. 7 of Pub. No. U.S. 2009/0046490, where multiple phase operations are employed.

Further, it is contemplated that the voltages may be monitored from phase-to-phase or from phase-to-neutral. A schematic of a contemplated virtual neutral circuit is in FIG. 10. Other virtual neutral circuits are also contemplated. A virtual neutral circuit may be used as a reference in situations where three phase power is available only in delta mode and there is no neutral present for use as a reference. It is also contemplated that a window comparator may be used to detect zero-crossings of both positive and negative halves of a current wave form. A window comparator is in FIGS. 7 and 8. Other window comparators are also contemplated. FIGS. 8, 9 and 10 of Pub. No. U.S. 2009/0046490 propose a circuit diagram and oscillogram, respectively, of a half cycle indentifying means that is contemplated.

Figure 31:
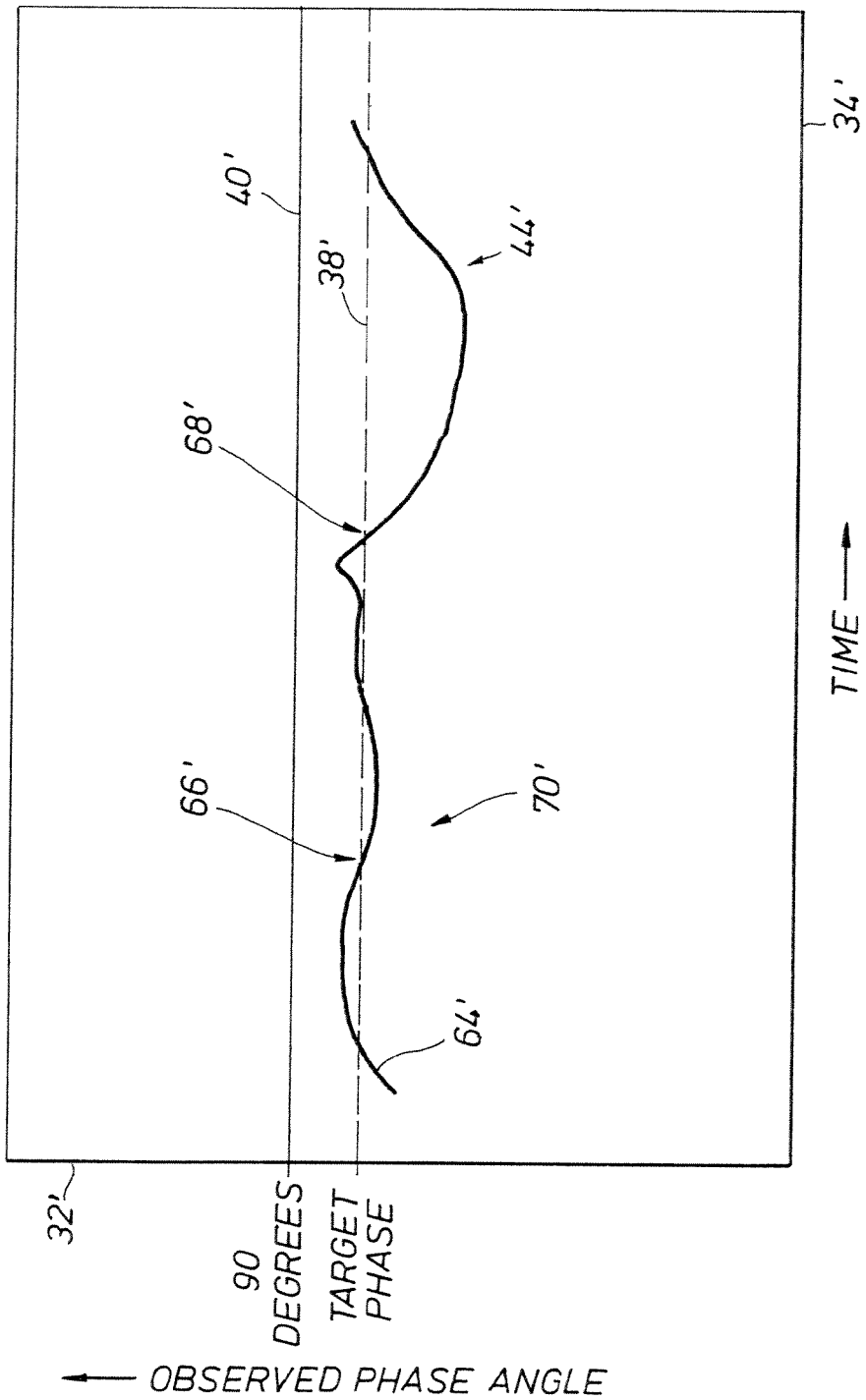
FIG. 31 is a plot of observed phase angle versus time for a pump jack motor in a closed loop control mode with a reduction of motor voltage to achieve a target phase angle within one complete pumping cycle.

Turning to FIG. 31, plot 64' with observed phase angle on the vertical axis 32' and time on the horizontal axis 34' is shown for an electric motor attached with a pump jack, such as motor 6' and pump jack 30' in FIG. 28, in closed loop mode. As in FIG. 29, there is a target phase angle of less than 90 degrees at first horizontal line 38'. Unlike in FIG. 29, the electric motor output represented in FIG. 31 is from a closed loop system 48' disposed with the motor as shown in FIG. 30.

Plot first segment 70' in FIG. 31 is where the observed phase angle would exceed the target phase angle in open loop mode. However, in closed loop mode in plot first segment 70' the error signal 60' creates a control effort by the controller 50' to reduce the supply voltage 54' to the motor to maintain the target phase angle 38'. When the observed phase angle would exceed 90 degrees in open loop mode, the large values of observed phase angle create large values of the error signal 60' in FIG. 30.

During plot first segment 70', the motor is effectively turned off using PWM techniques, but without actually cutting the power to the motor. There is still current flowing in the motor during this time, which allows the controller 50' to know when to increase the supply voltage to the motor needed during the energy consumption mode. The real component of the current may be reduced virtually to zero, leaving a reactive component greater than zero. By allowing some current flow when it is reducing voltage, mostly of a reactive nature, an observable feedback parameter is provided that is used in the closed loop control system 48' as an indication of the load condition, to which the controller 50' may react, supplying power when needed in the energy consumption phase.

Since the current is of reactive nature, the only power remaining is of an apparent nature. The current flow allows the controller to continuously observe the phase angle between the current and the voltage. The maximum motor voltage reduction occurs approximately at plot first location 66' in FIG. 31 when the observed phase angle in open loop mode as shown in FIG. 29 would otherwise be at its maximum value greater than 90 degrees.

When the observed phase angle exceeds the target phase angle in closed loop mode, the supply voltage may be reduced with PWM techniques until the observed phase angle reaches the target phase angle. At the beginning of plot first segment 70' in FIG. 31, the motor controller 50' reduces the observed phase angle from open loop mode down to the target phase angle. The controller 50' thereafter maintains the observed phase angle substantially at the target phase angle. Any further reduction in observed phase angle below the target phase angle may be interpreted as an increase in load, to which the controller 50' may respond by increasing the supply voltage 54' until the target phase angle is once again reached. The maximum increase of supply voltage to the motor occurs at plot second location 68' when the observed phase angle drops below the target phase angle. When the counterweight or reciprocating mass is driven by the motor, the values of the observed phase angle will typically be smaller than the target phase angle, which will create an error signal that creates a control effort by the controller 50' to increase the supply voltage to the motor. The motor is in the heavy energy consumption mode in plot second segment 44' below first horizontal line 38'.

Figure 32:
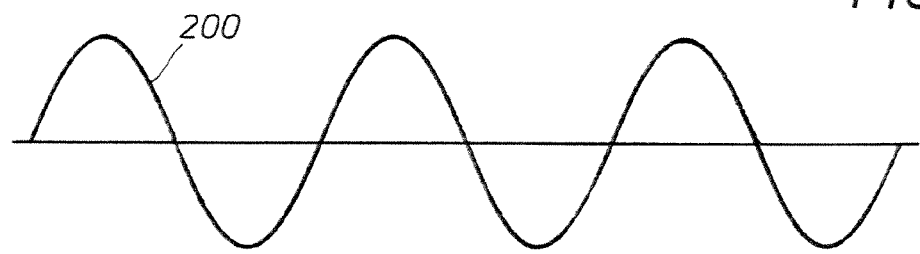
FIG. 32 is a single phase waveform plot of incoming line voltage.
Figure 32A:
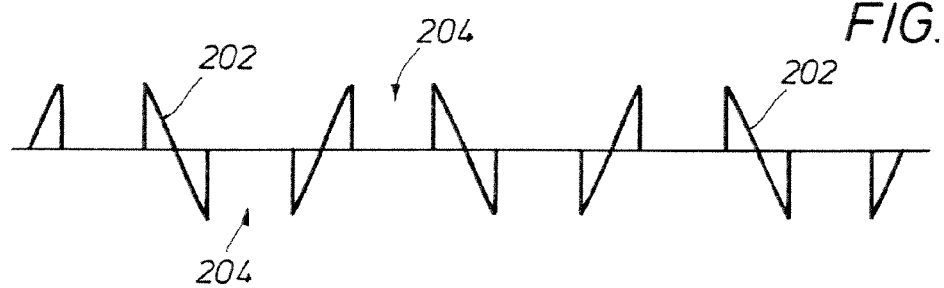
FIG. 32A is a heavily chopped single phase waveform plot of the voltage supplied to the motor after the application of pulse width modulation (PWM) techniques.
Figure 32B:
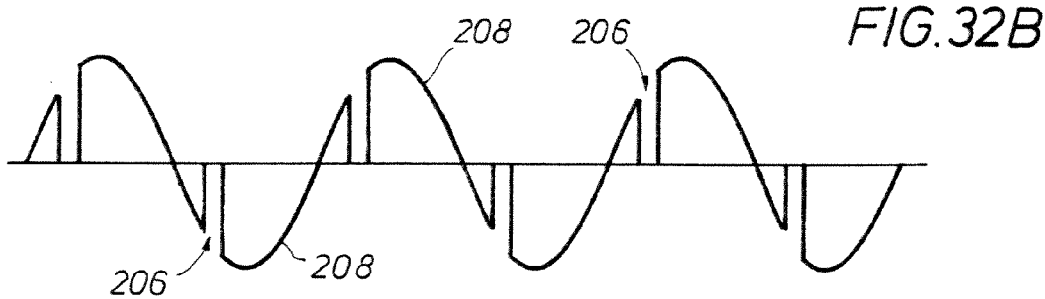
FIG. 32B is a lightly chopped single phase waveform plot of the voltage supplied to the motor after the application of PWM techniques.

Turning to FIG. 32, waveform plot 200 of incoming line voltage is illustrated in single phase, although three-phase voltage is also contemplated. In FIG. 32A, PWM techniques have been used to chop out or remove voltage waveform plot segments 204 while leaving voltage waveform plot segments 202. FIG. 32A illustrates heavy chopping of the supply voltage in which large segments 204 of the voltage waveform are chopped out. FIG. 32B illustrates light chopping of the voltage waveform with PWM techniques, wherein the voltage waveform plot segments 206 that are chopped out are smaller than the chopped out segments 204 shown in FIG. 32A. In FIG. 32B, the waveform plot segments 208 that are left are larger than the waveform plot segments 202 that are left in FIG. 32A.

The heavy chopping in FIG. 32A occurs during the period that open loop energy generation mode would be occurring, such as in FIG. 31 at plot first location 66'. In FIG. 32D, the period of heavy chopping 210A is illustrated at plot segment 210. The reduction of voltage shown in FIG. 32A reduces the real component of the current virtually to zero, while leaving a reactive component greater than zero. This is the period when the motor is effectively turned off, while still leaving sufficient current to observe the phase angle.

When the motor is in heavy energy consumption mode, such as occurs in FIG. 31 at plot second segment 44', then substantially no voltage waveform segments are eliminated, and the motor supply voltage is substantially as shown in FIG. 32. In FIG. 32D, the period of substantially no chopping 212A occurs at plot segment 212.

Figure 32C:
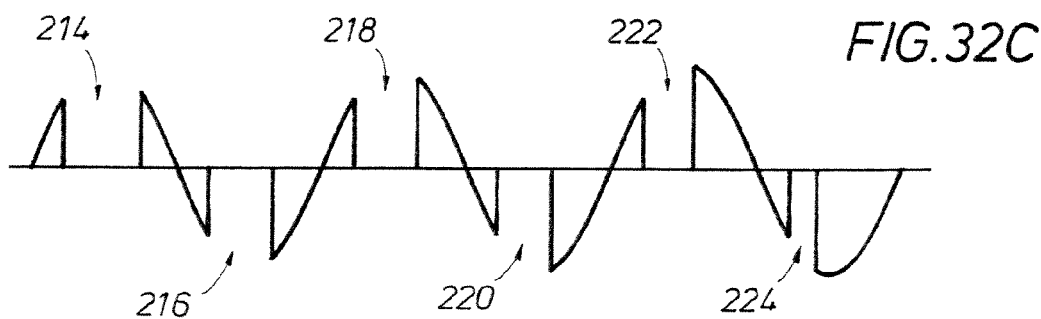
FIG. 32C is a variably chopped single phase waveform plot of the voltage supplied to the motor after the application of PWM techniques.

In FIG. 32D, the DSP controller is in control mode at plot locations 226 and 228. During those periods, the motor is not in heavy energy consumption mode and not in the period when open loop energy generation mode would be occurring. In control mode, light chopping 226A as shown in FIG. 32B may occur or variable chopping as shown in FIG. 32C may occur to control the motor voltage. This may happen when the motor is lightly loaded, saving energy while the motor is still consuming energy. Variable chopping in FIG. 32C uses PWM to chop waveform plot segments (214, 216, 218, 220, 222, 224) of varying sizes to control the motor voltage. The size of the voltage waveform plot segments (214, 216, 218, 220, 222, 224) chopped in FIG. 32C may all be different, leaving voltage waveform plot segments that are also all different sizes.

It should be understood that the motor controller may use any combination or permutation of light chopping, heavy chopping, variable chopping or no chopping to control the observed phase angle of the motor supply voltage to the target phase angle. The digital signal processor (DSP) or motor controller attempts to maintain a substantially constant observed phase angle and will chop the amount required to do so. The DSP controls the motor voltage based on observing the phase angle. The amount of the chopping of the supply voltage may vary.

When the electric motor running open loop is in energy generation mode, the load presented by the utility grid effectively acts as a brake on the motor, thereby limiting its speed. This occurs due to the generated voltage attempting to exceed the voltage presented by the utility, thereby causing the current presented to flow in the opposite direction. When the closed loop controller system and method is applied as shown in FIGS. 30-32D, this braking action may be effectively minimized or removed, and the motor and system will typically speed up during this time. This additional kinetic energy stored in the system will be used to perform a portion of the pumping action without consuming energy in the motor. Minimizing or substantially preventing energy generation eliminates the need to consume energy in other parts of the pumping cycle, thereby saving energy.

As can now be understood, the electric power supplied to the motor is "effectively" turned off during the energy generation mode that would occur in open loop, while maintaining the feedback signals of voltage and current to determine when to turn the electric motor back on when the observed phase angle is diminishing. This system and method will constantly adapt to changing parameters in the well, which could not be done in the past. For one example, the motor and system are adaptive to pumping two or more fluids at different times having different densities or weights. Voltage and current monitored by the system serve as an indicator of the well condition, allowing the system to be adaptive to the changing well parameters. By not entering the energy generation mode, the braking action that is created by the open loop energy generation mode may be minimized or eliminated, so the benefit of speed up in the system is obtained. By minimizing or eliminating energy that would otherwise be consumed by the system, energy savings may result both from reduction of the supply voltage to the motor and from the minimization or elimination of the braking action of the motor when in generation mode.

All types and designs of electric motors are contemplated for use with the different embodiments of the invention described above, including, but not limited to, AC induction motors and AC synchronous motors. All types and designs of pump jacks are contemplated for use with the different embodiments of the invention described above, including, but not limited to, all conventional designs, the Lufkin Mark II design, beam-balanced design, and conventional portable design. Although the embodiments have been shown with pump jacks, it is also contemplated that all of the embodiments described above may be used with any device having a rotating or reciprocating mass. Although some of the embodiments have been shown with single phase voltage and current, all of the embodiments of the invention are contemplated with single or multiple phase voltage and current.

The foregoing disclosure and description of the invention are illustrative and explanatory thereof, and various changes in the details of the illustrated apparatus and system, and the construction and the method of operation may be made without departing from the spirit of the invention.

We claim:

1. A method of saving energy for an electric motor having periodic load variations, the method comprising the steps of:
   supplying voltage and current to said electric motor having periodic load variations;
   observing a phase angle between the voltage and the current supplied to said electric motor;
   obtaining a control line having a plurality of target phase angles that correspond to load conditions placed on said electric motor;
   comparing the observed phase angle with a corresponding target phase angle obtained from the control line; and
   reducing the voltage supplied to said electric motor when the observed phase angle is greater than the target phase angle.

2. The method of claim 1, wherein the current comprises a real component and a reactive component, and wherein the step of reducing the voltage supplied to said electric motor includes decreasing the current real component to substantially zero while the current reactive component is greater than zero.

3. The method of claim 2, wherein the reactive component of the current is greater than zero to observe the phase angle.

4. The method of claim 1, further comprising rotating a pump jack counterweight with said electric motor and wherein the step of reducing the voltage supplied includes decreasing a braking action of said electric motor on said rotating pump jack counterweight.

5. The method of claim 4, further comprising the step of:
   causing a tubular string connected to a pump jack to move in a substantially vertical direction, wherein the step of reducing the voltage supplied includes decreasing the braking action of said electric motor during reciprocating the tubular string.

6. The method of claim 1, wherein the step of reducing the voltage supplied includes decreasing a braking action of said electric motor.

7. The method of claim 1, further comprising the steps of:
detecting operation of said electric motor under a first load condition;
reducing the voltage supplied to said electric motor when the observed phase angle is greater than the corresponding target phase angle when operating under the first load condition;
detecting operation of said electric motor under a second load condition; and
reducing the voltage supplied to said electric motor when the observed phase angle is greater than the corresponding target phase angle when operating under the second load condition.

8. The method of claim 1, further comprising the step of:
maintaining the observed phase angle substantially at the corresponding target phase angle.

9. The method of claim 8, further comprising the step of:
increasing the supply voltage to said electric motor when the observed phase angle is less than the corresponding target phase angle.

10. The method of claim 1, wherein the target phase angle is maintained constant for all loads applied to said electric motor.

11. The method of claim 1, wherein the target phase angle is adjusted according to a variable function of the load, the target phase angle being applied at any instant to said electric motor.

12. The method of claim 1, wherein the step of comparing is performed by a closed loop motor controller in electrical communication with said electric motor.

13. A system for saving energy for an electric motor having periodic load variations, the system comprising:
a closed loop controller in electrical communication with said electric motor, the closed loop controller having a processor with instructions executable to:
observe a phase angle between a voltage and a current supplied to said electric motor;
obtain a control line having a plurality of target phase angles that correspond to load conditions placed on said electric motor;
compare the observed phase angle with a corresponding target phase angle obtained from the control line; and
reduce the voltage supplied to said electric motor when the observed phase angle is greater than the target phase angle.

14. A method for saving energy for a motor having periodic load variations, the method comprising the steps of:
supplying voltage and current to said motor, the current having a real component and a reactive component;
observing a phase angle between the voltage and the current supplied to said motor;
obtaining a control line having a plurality of target phase angles that correspond to load conditions placed on said motor;
comparing the observed phase angle with a corresponding target phase angle obtained from the control line; and
reducing the voltage supplied to said motor when the observed phase angle is greater than the corresponding target phase angle and decreasing the current real component to substantially zero while maintaining the current reactive component at a value greater than zero.

15. The method of claim 14, wherein the current reactive component is maintained at a value greater than zero to observe the phase angle.

16. The method of claim 14, further comprising reciprocating a tubular string with said motor and wherein the step of reducing the voltage supplied includes decreasing a braking action of the motor on said reciprocating tubular string.

17. A method for saving energy for an electric-motor having periodic load variations, the method comprising the steps of:
supplying voltage and current to said electric motor having periodic load variations;
observing a phase angle between the voltage and the current supplied to said electric motor;
obtaining a control line having a plurality of target phase angles that correspond to load conditions placed on said electric motor;
comparing the observed phase angle with a corresponding target phase angle obtained from the control line; and
reducing the voltage supplied to said electric motor when the observed phase angle is greater than the target phase, the step of reducing includes decreasing a braking action of the electric motor.

18. The method of claim 17, wherein the current comprises a real component and a reactive component, and wherein the step of reducing the voltage supplied to said electric motor includes decreasing the current real component to substantially zero while the current reactive component is greater than zero.

19. A method for saving energy for an electric motor having periodic load variations, the method comprising the steps of:
supplying voltage and current to said electric motor having periodic load variations;
controlling said electric motor with a closed loop controller;
obtaining a control line having a plurality of target phase angles that correspond to load conditions placed on the electric motor; and
reducing the voltage supplied to said electric motor with said closed loop controller, the closed loop motor controller reducing the voltage supplied to drive an observed phase angle of said electric motor to a corresponding target phase angle obtained from the control line.

20. The method of claim 19, wherein said current comprises a real component and a reactive component, and said closed loop motor controller is configured to decrease a braking action of said electric motor by controlling said real component of said current to be substantially zero while said reactive component of said current is greater than zero.

21. The method of claim 19, wherein the current comprises a real component and a reactive component, and wherein the step of reducing the voltage supplied to said electric motor includes decreasing the current real component to substantially zero while the current reactive component is greater than zero.

22. The method of claim 19, further comprising the steps of:
observing the phase angle between the voltage and the current supplied to said electric motor; and
maintaining the corresponding target phase angle between the voltage and the current supplied to said electric motor.

23. The method of claim 22, further comprising the step of:
increasing the voltage supplied to said electric motor when the observed phase angle is less than the corresponding target phase angle.

* * * * *